(12) United States Patent  (10) Patent No.: US 10,277,531 B2
Jackson                    (45) Date of Patent: *Apr. 30, 2019

(54) ON-DEMAND ACCESS TO COMPUTE RESOURCES

(71) Applicant: III Holdings 12, LLC, Wilmington, DE (US)

(72) Inventor: David Brian Jackson, Spanish Fork, UT (US)

(73) Assignee: III Holdings 2, LLC, Wilmington, DE (US)

( * ) Notice: Subject to any disclaimer, the term of this patent is extended or adjusted under 35 U.S.C. 154(b) by 779 days.

This patent is subject to a terminal disclaimer.

(21) Appl. No.: 14/791,873

(22) Filed: Jul. 6, 2015

(65) Prior Publication Data

US 2015/0326500 A1    Nov. 12, 2015

Related U.S. Application Data

(63) Continuation of application No. 11/279,007, filed on Apr. 7, 2006, now Pat. No. 9,075,657.

(Continued)

(51) Int. Cl.
*G06F 9/50*  (2006.01)
*H04L 12/54* (2013.01)
(Continued)

(52) U.S. Cl.
CPC .......... *H04L 47/827* (2013.01); *G06F 9/5027* (2013.01); *H04L 67/1002* (2013.01);
(Continued)

(58) Field of Classification Search
CPC ............ G06F 2209/509; G06F 9/5083; H04W 24/10; H04W 28/26
(Continued)

(56) References Cited

U.S. PATENT DOCUMENTS 4,215,406 A   7/1980   Gomola et al.
4,532,893 A   8/1985   Day et al.
(Continued)

FOREIGN PATENT DOCUMENTS

CA   2496783       3/2004
EP   0268435 B1   5/1988
(Continued)

OTHER PUBLICATIONS

US 7,774,482 B1, 08/2010, Szeto et al. (withdrawn)
(Continued)

*Primary Examiner* — Younes Naji
(74) *Attorney, Agent, or Firm* — Foley & Lardner LLP

(57) ABSTRACT

Disclosed are systems, methods and computer-readable media for controlling and managing the identification and provisioning of resources within an on-demand center as well as the transfer of workload to the provisioned resources. One aspect involves creating a virtual private cluster within the on-demand center for the particular workload from a local environment. A method of managing resources between a local compute environment and an on-demand environment includes detecting an event associated with a local compute environment and based on the detected event, identifying information about the local environment, establishing communication with an on-demand compute environment and transmitting the information about the local environment to the on-demand compute environment, provisioning resources within the on-demand compute environment to substantially duplicate the local environment and transferring workload from the local-environment to the on-demand compute environment. The event can be a threshold or a triggering event within or outside of the local environment.

19 Claims, 9 Drawing Sheets

Related U.S. Application Data

(60) Provisional application No. 60/669,278, filed on Apr. 7, 2005.

(51) Int. Cl.
  *H04L 29/06*  (2006.01)
  *H04L 29/08*  (2006.01)
  *H04L 12/911*  (2013.01)

(52) U.S. Cl.
  CPC .... H04L 67/1008 (2013.01); *G06F 2209/509* (2013.01); *H04L 12/56* (2013.01); *H04L 29/06* (2013.01)

(58) Field of Classification Search
  USPC ......................................................... 709/223
  See application file for complete search history.

(56) References Cited

U.S. PATENT DOCUMENTS

| | | | |
|---|---|---|---|
| 4,553,202 A | 11/1985 | Trufyn | |
| 4,677,614 A | 6/1987 | Circo | |
| 4,852,001 A | 7/1989 | Tsushima et al. | |
| 4,943,932 A | 7/1990 | Lark et al. | |
| 5,146,561 A | 9/1992 | Carey et al. | |
| 5,299,115 A | 3/1994 | Fields et al. | |
| 5,325,526 A | 6/1994 | Cameron et al. | |
| 5,349,682 A | 9/1994 | Rosenberry | |
| 5,377,332 A | 12/1994 | Entwistle et al. | |
| 5,542,000 A | 7/1996 | Semba | |
| 5,598,536 A | 1/1997 | Slaughter et al. | |
| 5,600,844 A | 2/1997 | Shaw et al. | |
| 5,651,006 A | 7/1997 | Fujino et al. | |
| 5,675,739 A | 10/1997 | Eilert et al. | |
| 5,701,451 A | 12/1997 | Rogers et al. | |
| 5,737,009 A | 4/1998 | Payton | |
| 5,761,433 A | 6/1998 | Billings | |
| 5,774,660 A | 6/1998 | Brendel et al. | |
| 5,774,668 A | 6/1998 | Choquier et al. | |
| 5,826,239 A | 10/1998 | Du et al. | |
| 5,854,887 A | 12/1998 | Kindell et al. | |
| 5,874,789 A | 2/1999 | Su | |
| 5,920,545 A | 7/1999 | Räsänen et al. | |
| 5,935,293 A | 8/1999 | Detering et al. | |
| 5,961,599 A | 10/1999 | Kalavade et al. | |
| 5,987,611 A | 11/1999 | Freund | |
| 6,006,192 A | 12/1999 | Cheng et al. | |
| 6,052,707 A | 4/2000 | D'Souza | |
| 6,078,953 A | 6/2000 | Vaid et al. | |
| 6,097,882 A | 8/2000 | Mogul | |
| 6,108,662 A | 8/2000 | Hoskins et al. | |
| 6,151,598 A | 11/2000 | Shaw et al. | |
| 6,161,170 A | 12/2000 | Burger et al. | |
| 6,175,869 B1 | 1/2001 | Ahuja et al. | |
| 6,185,601 B1 | 2/2001 | Wolff | |
| 6,195,678 B1 | 2/2001 | Komuro | |
| 6,201,611 B1 | 3/2001 | Carter et al. | |
| 6,202,080 B1 | 3/2001 | Lu et al. | |
| 6,223,202 B1 | 4/2001 | Bayeh | |
| 6,226,677 B1 | 5/2001 | Slemmer | |
| 6,247,056 B1 | 6/2001 | Chou et al. | |
| 6,253,230 B1 | 6/2001 | Couland et al. | |
| 6,289,382 B1 | 9/2001 | Bowman-Amuah | |
| 6,314,114 B1 | 11/2001 | Coyle et al. | |
| 6,317,787 B1 | 11/2001 | Boyd et al. | |
| 6,327,364 B1 | 12/2001 | Shaffer et al. | |
| 6,330,562 B1 | 12/2001 | Boden et al. | |
| 6,330,605 B1 | 12/2001 | Christensen et al. | |
| 6,338,085 B1 | 1/2002 | Ramaswamy | |
| 6,338,112 B1 | 1/2002 | Wipfel et al. | |
| 6,343,311 B1 | 1/2002 | Nishida et al. | |
| 6,345,287 B1 | 2/2002 | Fong et al. | |
| 6,351,775 B1 | 2/2002 | Yu | |
| 6,363,488 B1 | 3/2002 | Ginter et al. | |
| 6,366,945 B1 * | 4/2002 | Fong | G06F 9/5066 718/104 |
| 6,370,584 B1 | 4/2002 | Bestavros et al. | |
| 6,374,254 B1 | 4/2002 | Cochran et al. | |
| 6,385,302 B1 | 5/2002 | Antonucci et al. | |
| 6,393,569 B1 | 5/2002 | Orensthteyn | |
| 6,418,459 B1 | 7/2002 | Gulick | |
| 6,434,568 B1 | 8/2002 | Bowman-Amuah | |
| 6,438,125 B1 | 8/2002 | Brothers | |
| 6,438,594 B1 | 8/2002 | Bowman-Amuah | |
| 6,452,924 B1 | 9/2002 | Golden et al. | |
| 6,463,454 B1 | 10/2002 | Lumelsky et al. | |
| 6,466,980 B1 | 10/2002 | Lumelsky et al. | |
| 6,477,580 B1 | 11/2002 | Bowman-Amuah | |
| 6,487,390 B1 | 11/2002 | Virine et al. | |
| 6,490,432 B1 | 12/2002 | Wegener et al. | |
| 6,520,591 B1 | 2/2003 | Jun et al. | |
| 6,571,215 B1 | 5/2003 | Mahapatro | |
| 6,578,068 B1 | 6/2003 | Bowman-Amuah | |
| 6,600,898 B1 | 7/2003 | De Bonet et al. | |
| 6,601,234 B1 | 7/2003 | Bowman-Amuah | |
| 6,606,660 B1 | 8/2003 | Bowman-Amuah | |
| 6,622,168 B1 | 9/2003 | Datta | |
| 6,626,077 B1 | 9/2003 | Gilbert | |
| 6,633,544 B1 | 10/2003 | Rexford et al. | |
| 6,640,238 B1 | 10/2003 | Bowman-Amuah | |
| 6,651,098 B1 | 11/2003 | Carroll et al. | |
| 6,724,733 B1 | 4/2004 | Schuba et al. | |
| 6,735,188 B1 | 5/2004 | Becker et al. | |
| 6,738,736 B1 | 5/2004 | Bond | |
| 6,772,211 B2 | 8/2004 | Lu et al. | |
| 6,779,016 B1 | 8/2004 | Aziz et al. | |
| 6,781,990 B1 | 8/2004 | Puri et al. | |
| 6,785,724 B1 | 8/2004 | Drainville et al. | |
| 6,816,903 B1 | 11/2004 | Rakoshitz et al. | |
| 6,816,905 B1 | 11/2004 | Sheets et al. | |
| 6,857,020 B1 | 2/2005 | Cheer et al. | |
| 6,862,606 B1 | 3/2005 | Major et al. | |
| 6,868,097 B1 | 3/2005 | Soda et al. | |
| 6,874,031 B2 | 3/2005 | Corbeil | |
| 6,928,471 B2 | 8/2005 | Pabari et al. | |
| 6,947,982 B1 | 9/2005 | McGann et al. | |
| 6,971,098 B2 | 11/2005 | Khare et al. | |
| 6,978,310 B1 | 12/2005 | Rodriguez et al. | |
| 7,013,322 B2 | 3/2006 | Lahr | |
| 7,020,719 B1 | 3/2006 | Grove et al. | |
| 7,058,070 B2 | 6/2006 | Tran et al. | |
| 7,080,378 B1 | 7/2006 | Noland et al. | |
| 7,082,606 B2 | 7/2006 | Wood et al. | |
| 7,085,837 B2 | 8/2006 | Kimbrel et al. | |
| 7,085,893 B2 | 8/2006 | Krissell et al. | |
| 7,099,933 B1 | 8/2006 | Wallace et al. | |
| 7,100,192 B1 | 8/2006 | Igawa et al. | |
| 7,102,996 B1 | 9/2006 | Amdahl et al. | |
| 7,103,625 B1 | 9/2006 | Hipp et al. | |
| 7,124,289 B1 | 10/2006 | Suorsa | |
| 7,126,913 B1 | 10/2006 | Patel et al. | |
| 7,143,088 B2 | 11/2006 | Green et al. | |
| 7,146,233 B2 | 12/2006 | Aziz et al. | |
| 7,146,416 B1 | 12/2006 | Yoo et al. | |
| 7,155,478 B2 | 12/2006 | Ims et al. | |
| 7,177,823 B2 | 2/2007 | Lam et al. | |
| 7,185,046 B2 | 2/2007 | Ferstl et al. | |
| 7,197,549 B1 | 3/2007 | Salama et al. | |
| 7,197,559 B2 | 3/2007 | Goldstein et al. | |
| 7,206,819 B2 | 4/2007 | Schmidt | |
| 7,216,173 B2 | 5/2007 | Clayton et al. | |
| 7,225,249 B1 | 5/2007 | Barry et al. | |
| 7,228,350 B2 | 6/2007 | Hong et al. | |
| 7,231,445 B1 | 6/2007 | Aweya et al. | |
| 7,242,501 B2 | 7/2007 | Ishimoto | |
| 7,251,688 B2 | 7/2007 | Leighton et al. | |
| 7,278,142 B2 | 10/2007 | Bandhole et al. | |
| 7,281,045 B2 | 10/2007 | Aggarwal et al. | |
| 7,293,092 B2 | 11/2007 | Sukegawa | |
| 7,299,294 B1 | 11/2007 | Bruck et al. | |
| 7,305,464 B2 | 12/2007 | Phillipi et al. | |
| 7,313,793 B2 | 12/2007 | Traut et al. | |
| 7,320,025 B1 | 1/2008 | Steinberg et al. | |

(56) References Cited

U.S. PATENT DOCUMENTS

| | | |
|---|---|---|
| 7,324,555 B1 | 1/2008 | Chen et al. |
| 7,328,406 B2 | 2/2008 | Kalinoski et al. |
| 7,334,230 B2 | 2/2008 | Chung et al. |
| 7,350,186 B2 | 3/2008 | Coleman et al. |
| 7,353,276 B2 | 4/2008 | Bain et al. |
| 7,356,655 B2 | 4/2008 | Allen et al. |
| 7,356,770 B1 | 4/2008 | Jackson |
| 7,373,391 B2 | 5/2008 | Iinuma |
| 7,373,524 B2 | 5/2008 | Motsinger et al. |
| 7,380,039 B2 | 5/2008 | Miloushev et al. |
| 7,386,586 B1 | 6/2008 | Headley et al. |
| 7,386,611 B2 | 6/2008 | Dias et al. |
| 7,389,310 B1 | 6/2008 | Bhagwan et al. |
| 7,392,325 B2 | 6/2008 | Grove et al. |
| 7,398,216 B2 | 7/2008 | Barnett et al. |
| 7,401,355 B2 | 7/2008 | Supnik et al. |
| 7,415,709 B2 | 8/2008 | Hipp et al. |
| 7,418,518 B2 | 8/2008 | Grove et al. |
| 7,421,402 B2 | 9/2008 | Chang et al. |
| 7,421,500 B2 | 9/2008 | Talwar et al. |
| 7,426,546 B2 | 9/2008 | Breiter et al. |
| 7,428,540 B1 | 9/2008 | Coates et al. |
| 7,437,460 B2 | 10/2008 | Chidambaran et al. |
| 7,437,730 B2 | 10/2008 | Goyal |
| 7,441,261 B2 | 10/2008 | Slater et al. |
| 7,454,467 B2 | 11/2008 | Girouard et al. |
| 7,461,134 B2 | 12/2008 | Ambrose |
| 7,464,159 B2 | 12/2008 | Di Luoffo et al. |
| 7,467,225 B2 | 12/2008 | Anerousis et al. |
| 7,483,945 B2 | 1/2009 | Blumofe |
| 7,492,720 B2 | 2/2009 | Pruthi et al. |
| 7,502,884 B1 | 3/2009 | Shah et al. |
| 7,503,045 B1 | 3/2009 | Aziz et al. |
| 7,516,221 B2 | 4/2009 | Souder et al. |
| 7,529,835 B1 | 5/2009 | Agronow et al. |
| 7,533,385 B1 | 5/2009 | Barnes |
| 7,546,553 B2 | 6/2009 | Bozak et al. |
| 7,551,614 B2 | 6/2009 | Teisberg et al. |
| 7,554,930 B2 | 6/2009 | Gaddis et al. |
| 7,577,722 B1 | 8/2009 | Khandekar et al. |
| 7,577,959 B2 | 8/2009 | Nguyen et al. |
| 7,583,607 B2 | 9/2009 | Steele et al. |
| 7,590,746 B2 | 9/2009 | Slater et al. |
| 7,590,747 B2 | 9/2009 | Coates et al. |
| 7,594,011 B2 | 9/2009 | Chandra |
| 7,596,784 B2 | 9/2009 | Abrams et al. |
| 7,610,289 B2 | 10/2009 | Muret et al. |
| 7,627,691 B1 | 12/2009 | Buchsbaum et al. |
| 7,640,547 B2 | 12/2009 | Neiman et al. |
| 7,657,535 B2 | 2/2010 | Moyaux et al. |
| 7,668,809 B1 | 2/2010 | Kelly et al. |
| 7,680,933 B2 | 3/2010 | Fatula, Jr. |
| 7,685,281 B1 | 3/2010 | Saraiya et al. |
| 7,693,976 B2 | 4/2010 | Perry et al. |
| 7,693,993 B2 | 4/2010 | Sheets et al. |
| 7,694,305 B2 | 4/2010 | Karlsson et al. |
| 7,698,386 B2 | 4/2010 | Amidon et al. |
| 7,698,398 B1 | 4/2010 | Lai |
| 7,698,430 B2 | 4/2010 | Jackson |
| 7,701,948 B2 | 4/2010 | Rabie et al. |
| 7,716,334 B2 | 5/2010 | Rao et al. |
| 7,725,583 B2 | 5/2010 | Jackson |
| 7,743,147 B2 | 6/2010 | Suorsa et al. |
| 7,747,451 B2 | 6/2010 | Keohane et al. |
| RE41,440 E | 7/2010 | Briscoe et al. |
| 7,752,258 B2 | 7/2010 | Lewin et al. |
| 7,752,624 B2 | 7/2010 | Crawford, Jr. et al. |
| 7,757,236 B1 | 7/2010 | Singh |
| 7,761,557 B2 | 7/2010 | Fellenstein et al. |
| 7,765,288 B2 | 7/2010 | Bainbridge et al. |
| 7,765,299 B2 | 7/2010 | Romero |
| 7,769,620 B1 | 8/2010 | Fernandez et al. |
| 7,774,331 B2 | 8/2010 | Barth et al. |
| 7,778,234 B2 | 8/2010 | Cooke et al. |
| 7,788,403 B2 | 8/2010 | Darugar et al. |
| 7,793,288 B2 | 9/2010 | Sameske |
| 7,796,619 B1 | 9/2010 | Feldmann et al. |
| 7,827,361 B1 | 11/2010 | Karlsson et al. |
| 7,844,787 B2 | 11/2010 | Ranganathan et al. |
| 7,930,397 B2 | 4/2011 | Midgley |
| 8,078,708 B1* | 12/2011 | Wang .................... G06F 9/505 |
| | | 709/203 |
| 8,260,893 B1 | 9/2012 | Bandhole et al. |
| 8,261,349 B2 | 9/2012 | Peng |
| 8,464,250 B1 | 6/2013 | Ansel |
| 2001/0051929 A1 | 12/2001 | Suzuki |
| 2002/0002578 A1 | 1/2002 | Yamashita |
| 2002/0002636 A1 | 1/2002 | Vange et al. |
| 2002/0010783 A1 | 1/2002 | Primak et al. |
| 2002/0049608 A1 | 4/2002 | Hartsell et al. |
| 2002/0059274 A1 | 5/2002 | Hartsell et al. |
| 2002/0062377 A1 | 5/2002 | Hillman et al. |
| 2002/0083299 A1 | 6/2002 | Van Huben et al. |
| 2002/0091786 A1 | 7/2002 | Yamaguchi et al. |
| 2002/0093915 A1 | 7/2002 | Larson |
| 2002/0107962 A1 | 8/2002 | Richter et al. |
| 2002/0116234 A1 | 8/2002 | Nagasawa |
| 2002/0116721 A1 | 8/2002 | Dobes et al. |
| 2002/0120741 A1 | 8/2002 | Webb et al. |
| 2002/0133821 A1 | 9/2002 | Shteyn |
| 2002/0152305 A1 | 10/2002 | Jackson et al. |
| 2002/0156891 A1 | 10/2002 | Ulrich et al. |
| 2002/0166117 A1 | 11/2002 | Abrams et al. |
| 2002/0173984 A1 | 11/2002 | Robertson et al. |
| 2002/0174227 A1 | 11/2002 | Hartsell et al. |
| 2002/0198734 A1 | 12/2002 | Greene et al. |
| 2003/0004772 A1 | 1/2003 | Dutta et al. |
| 2003/0014503 A1 | 1/2003 | Legout et al. |
| 2003/0014539 A1 | 1/2003 | Reznick |
| 2003/0039246 A1 | 2/2003 | Guo et al. |
| 2003/0050989 A1 | 3/2003 | Marinescu et al. |
| 2003/0058277 A1 | 3/2003 | Bowman-Amuah |
| 2003/0065703 A1 | 4/2003 | Aborn |
| 2003/0069949 A1 | 4/2003 | Chan et al. |
| 2003/0097429 A1 | 5/2003 | Wu et al. |
| 2003/0097439 A1 | 5/2003 | Strayer et al. |
| 2003/0105721 A1 | 6/2003 | Ginter et al. |
| 2003/0120472 A1 | 6/2003 | Lind |
| 2003/0120701 A1 | 6/2003 | Pulsipher et al. |
| 2003/0120710 A1 | 6/2003 | Pulsipher et al. |
| 2003/0126202 A1 | 7/2003 | Watt |
| 2003/0144894 A1 | 7/2003 | Robertson et al. |
| 2003/0158940 A1 | 8/2003 | Leigh |
| 2003/0177121 A1 | 9/2003 | Moona et al. |
| 2003/0177334 A1 | 9/2003 | King et al. |
| 2003/0182429 A1 | 9/2003 | Jagels |
| 2003/0191857 A1 | 10/2003 | Terrell et al. |
| 2003/0195931 A1 | 10/2003 | Dauger |
| 2003/0210694 A1 | 11/2003 | Jayaraman et al. |
| 2003/0212738 A1 | 11/2003 | Wookey et al. |
| 2003/0231647 A1 | 12/2003 | Petrovykh |
| 2004/0003077 A1 | 1/2004 | Bantz et al. |
| 2004/0010544 A1 | 1/2004 | Slater et al. |
| 2004/0010550 A1 | 1/2004 | Gopinath |
| 2004/0015579 A1 | 1/2004 | Cooper et al. |
| 2004/0034873 A1 | 2/2004 | Zenoni |
| 2004/0039815 A1 | 2/2004 | Evans et al. |
| 2004/0044718 A1 | 3/2004 | Ferstl et al. |
| 2004/0054630 A1 | 3/2004 | Ginter et al. |
| 2004/0054777 A1 | 3/2004 | Ackaouy et al. |
| 2004/0054780 A1 | 3/2004 | Romero |
| 2004/0066782 A1 | 4/2004 | Nassar |
| 2004/0103078 A1 | 5/2004 | Smedberg et al. |
| 2004/0103305 A1 | 5/2004 | Ginter et al. |
| 2004/0117610 A1 | 6/2004 | Hensley |
| 2004/0121777 A1 | 6/2004 | Schwarz et al. |
| 2004/0128495 A1 | 7/2004 | Hensley |
| 2004/0128670 A1 | 7/2004 | Robinson et al. |
| 2004/0133665 A1 | 7/2004 | Deboer et al. |
| 2004/0139202 A1 | 7/2004 | Talwar et al. |
| 2004/0143664 A1 | 7/2004 | Usa et al. |
| 2004/0179528 A1 | 9/2004 | Powers et al. |
| 2004/0181370 A1 | 9/2004 | Froehlich et al. |
| 2004/0181476 A1 | 9/2004 | Smith et al. |

(56) References Cited

U.S. PATENT DOCUMENTS

| | | |
|---|---|---|
| 2004/0189677 A1 | 9/2004 | Coile et al. |
| 2004/0194098 A1 | 9/2004 | Chung et al. |
| 2004/0199621 A1 | 10/2004 | Lau |
| 2004/0199646 A1 | 10/2004 | Susai et al. |
| 2004/0203670 A1 | 10/2004 | King et al. |
| 2004/0213395 A1 | 10/2004 | Ishii et al. |
| 2004/0218615 A1 | 11/2004 | Griffin et al. |
| 2004/0221038 A1 | 11/2004 | Clarke et al. |
| 2004/0236852 A1 | 11/2004 | Birkestrand et al. |
| 2004/0260746 A1 | 12/2004 | Brown et al. |
| 2004/0267897 A1 | 12/2004 | Hill et al. |
| 2005/0010465 A1 | 1/2005 | Drew et al. |
| 2005/0021759 A1 | 1/2005 | Gupta et al. |
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027864 A1 | 2/2005 | Bozak et al. |
| 2005/0027865 A1* | 2/2005 | Bozak .................. G06F 9/5027 709/226 |
| 2005/0038835 A1 | 2/2005 | Chidambaran et al. |
| 2005/0044226 A1 | 2/2005 | McDermott et al. |
| 2005/0044228 A1 | 2/2005 | Birkestrand et al. |
| 2005/0049884 A1 | 3/2005 | Hunt et al. |
| 2005/0050057 A1 | 3/2005 | Mital et al. |
| 2005/0054354 A1 | 3/2005 | Roman et al. |
| 2005/0055322 A1 | 3/2005 | Masters et al. |
| 2005/0055694 A1 | 3/2005 | Lee |
| 2005/0055698 A1 | 3/2005 | Sasaki et al. |
| 2005/0060360 A1 | 3/2005 | Doyle et al. |
| 2005/0060608 A1 | 3/2005 | Marchand |
| 2005/0080845 A1 | 4/2005 | Gopinath |
| 2005/0080891 A1 | 4/2005 | Cauthron |
| 2005/0091505 A1 | 4/2005 | Riley |
| 2005/0102396 A1 | 5/2005 | Hipp |
| 2005/0108407 A1 | 5/2005 | Johnson et al. |
| 2005/0113203 A1 | 5/2005 | Mueller |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0125537 A1 | 6/2005 | Martins et al. |
| 2005/0131898 A1 | 6/2005 | Fatula, Jr. |
| 2005/0132378 A1 | 6/2005 | Horvitz et al. |
| 2005/0144315 A1 | 6/2005 | George et al. |
| 2005/0149940 A1 | 7/2005 | Calinescu et al. |
| 2005/0160137 A1 | 7/2005 | Ishikawa et al. |
| 2005/0165925 A1 | 7/2005 | Dan et al. |
| 2005/0177600 A1 | 8/2005 | Eilam et al. |
| 2005/0187866 A1 | 8/2005 | Lee |
| 2005/0188088 A1 | 8/2005 | Fellenstein et al. |
| 2005/0192771 A1 | 9/2005 | Fischer et al. |
| 2005/0193103 A1 | 9/2005 | Drabik |
| 2005/0193231 A1 | 9/2005 | Scheuren |
| 2005/0198200 A1 | 9/2005 | Subramanian et al. |
| 2005/0202922 A1 | 9/2005 | Thomas |
| 2005/0210470 A1 | 9/2005 | Chung et al. |
| 2005/0213507 A1 | 9/2005 | Banerjee et al. |
| 2005/0234846 A1 | 10/2005 | Davidson et al. |
| 2005/0235150 A1 | 10/2005 | Kaler et al. |
| 2005/0243867 A1 | 11/2005 | Petite |
| 2005/0246705 A1 | 11/2005 | Etelson et al. |
| 2005/0268063 A1 | 12/2005 | Diao et al. |
| 2005/0278392 A1 | 12/2005 | Hansen et al. |
| 2005/0278760 A1 | 12/2005 | Dewar et al. |
| 2005/0283822 A1 | 12/2005 | Appleby et al. |
| 2005/0288961 A1 | 12/2005 | Tabrizi |
| 2005/0289540 A1 | 12/2005 | Nguyen et al. |
| 2006/0015773 A1 | 1/2006 | Singh et al. |
| 2006/0028991 A1 | 2/2006 | Tan et al. |
| 2006/0031379 A1 | 2/2006 | Kasriel et al. |
| 2006/0031547 A1 | 2/2006 | Tsui et al. |
| 2006/0031813 A1 | 2/2006 | Bishop et al. |
| 2006/0039246 A1 | 2/2006 | King et al. |
| 2006/0041444 A1 | 2/2006 | Flores et al. |
| 2006/0048157 A1 | 3/2006 | Dawson et al. |
| 2006/0059253 A1 | 3/2006 | Goodman et al. |
| 2006/0069671 A1 | 3/2006 | Conley et al. |
| 2006/0069926 A1 | 3/2006 | Ginter et al. |
| 2006/0089894 A1 | 4/2006 | Balk et al. |
| 2006/0090136 A1 | 4/2006 | Miller et al. |
| 2006/0095917 A1 | 5/2006 | Black-Ziegelbein et al. |
| 2006/0117208 A1 | 6/2006 | Davidson |
| 2006/0117317 A1 | 6/2006 | Crawford et al. |
| 2006/0129687 A1 | 6/2006 | Goldszmidt et al. |
| 2006/0136235 A1 | 6/2006 | Keohane et al. |
| 2006/0143350 A1 | 6/2006 | Miloushev et al. |
| 2006/0149695 A1 | 7/2006 | Bossman et al. |
| 2006/0155740 A1 | 7/2006 | Chen et al. |
| 2006/0159088 A1 | 7/2006 | Aghvami et al. |
| 2006/0168107 A1 | 7/2006 | Balan et al. |
| 2006/0168224 A1 | 7/2006 | Midgley |
| 2006/0173730 A1 | 8/2006 | Birkestrand |
| 2006/0189349 A1 | 8/2006 | Montulli et al. |
| 2006/0190775 A1 | 8/2006 | Aggarwal et al. |
| 2006/0190975 A1 | 8/2006 | Gonzalez |
| 2006/0212332 A1 | 9/2006 | Jackson |
| 2006/0212333 A1 | 9/2006 | Jackson |
| 2006/0212740 A1 | 9/2006 | Jackson |
| 2006/0224725 A1 | 10/2006 | Bali et al. |
| 2006/0224741 A1 | 10/2006 | Jackson |
| 2006/0227810 A1 | 10/2006 | Childress et al. |
| 2006/0251419 A1 | 11/2006 | Zadikian et al. |
| 2006/0294238 A1 | 12/2006 | Naik et al. |
| 2007/0050777 A1 | 3/2007 | Hutchinson et al. |
| 2007/0067366 A1 | 3/2007 | Landis |
| 2007/0083899 A1 | 4/2007 | Compton et al. |
| 2007/0088822 A1 | 4/2007 | Coile et al. |
| 2007/0094691 A1 | 4/2007 | Gazdzinski |
| 2007/0124344 A1 | 5/2007 | Rajakannimariyan et al. |
| 2007/0143824 A1 | 6/2007 | Shahbazi |
| 2007/0155406 A1 | 7/2007 | Dowling et al. |
| 2007/0180380 A1 | 8/2007 | Khavari et al. |
| 2007/0264986 A1 | 11/2007 | Warrillow et al. |
| 2007/0266136 A1 | 11/2007 | Esfahany et al. |
| 2007/0271375 A1 | 11/2007 | Hwang |
| 2008/0104231 A1 | 5/2008 | Dey et al. |
| 2008/0215730 A1 | 9/2008 | Sundaram et al. |
| 2008/0255953 A1 | 10/2008 | Chang et al. |
| 2008/0263558 A1 | 10/2008 | Lin et al. |
| 2008/0279167 A1 | 11/2008 | Cardei et al. |
| 2009/0070771 A1 | 3/2009 | Yuyitung et al. |
| 2009/0100133 A1 | 4/2009 | Giulio et al. |
| 2009/0103501 A1 | 4/2009 | Farrag et al. |
| 2009/0105059 A1 | 4/2009 | Dorry et al. |
| 2009/0113056 A1 | 4/2009 | Tameshige et al. |
| 2009/0138594 A1 | 5/2009 | Fellenstein et al. |
| 2009/0178132 A1 | 7/2009 | Hudis et al. |
| 2009/0210356 A1 | 8/2009 | Abrams et al. |
| 2009/0210495 A1 | 8/2009 | Wolfson et al. |
| 2009/0216910 A1 | 8/2009 | Duchesneau |
| 2009/0217329 A1 | 8/2009 | Riedl et al. |
| 2009/0225360 A1 | 9/2009 | Shirai |
| 2009/0234962 A1 | 9/2009 | Strong et al. |
| 2009/0234974 A1 | 9/2009 | Arndt et al. |
| 2009/0235104 A1 | 9/2009 | Fung |
| 2009/0238349 A1 | 9/2009 | Pezzutti |
| 2009/0292824 A1 | 11/2009 | Marashi et al. |
| 2009/0327489 A1 | 12/2009 | Swildens et al. |
| 2010/0036945 A1 | 2/2010 | Allibhoy et al. |
| 2010/0049931 A1 | 2/2010 | Jacobson et al. |
| 2010/0088205 A1 | 4/2010 | Robertson |
| 2010/0091676 A1 | 4/2010 | Moran et al. |
| 2010/0103837 A1 | 4/2010 | Jungck et al. |
| 2010/0114531 A1 | 5/2010 | Korn et al. |
| 2010/0153546 A1 | 6/2010 | Clubb et al. |
| 2010/0217801 A1 | 8/2010 | Leighton et al. |
| 2010/0235234 A1 | 9/2010 | Shuster |
| 2010/0281166 A1 | 11/2010 | Buyya et al. |
| 2010/0318665 A1 | 12/2010 | Demmer et al. |
| 2010/0332262 A1 | 12/2010 | Horvitz et al. |
| 2012/0137004 A1 | 5/2012 | Smith |
| 2012/0159116 A1 | 6/2012 | Lim et al. |
| 2012/0185334 A1 | 7/2012 | Sarkar et al. |
| 2012/0218901 A1 | 8/2012 | Jungck et al. |

(56) References Cited

U.S. PATENT DOCUMENTS

FOREIGN PATENT DOCUMENTS

| EP | 1331564 A1 | 7/2003 |
|---|---|---|
| EP | 1365545 A1 | 11/2003 |
| EP | 1492309 A3 | 12/2004 |
| EP | 1865684 A1 | 12/2007 |
| GB | 2391744 A | 2/2004 |
| KR | 2004/0107934 | 12/2004 |
| WO | WO 1998/011702 | 3/1998 |
| WO | WO 1999/057660 | 11/1999 |
| WO | WO 2000/014938 | 3/2000 |
| WO | WO 2000/060825 | 10/2000 |
| WO | WO 2001/009791 | 2/2001 |
| WO | WO 01/14987 | 3/2001 |
| WO | WO 01/15397 | 3/2001 |
| WO | WO 2001/039470 | 5/2001 |
| WO | WO 2003/046751 | 6/2003 |
| WO | WO 2004/070547 | 8/2004 |
| WO | WO 2004/092884 | 10/2004 |
| WO | WO 2005/017783 | 2/2005 |
| WO | WO 2006/036277 | 4/2006 |
| WO | WO 2006/112981 | 10/2006 |

OTHER PUBLICATIONS

Gupta et al. Provisioning a Virtual Private Network: A Network Design Problem for Multicommodity Flow 2001.*
Gupta, A., Kleinberg, J., Kumar, A., Rastogi, R. & Yener, B. "Provisioning a virtual private network: a network design problem for multicommodity flow," Proceedings of the thirty-third annual ACM symposium on Theory of computing [online], Jul. 2001, pp. 389-398, abstract [retrieved on Jun. 14, 2007].Retrieved from the Internet:<URL:http://portal.acm.org/citation.cfm?id=380830&dl=ACM&coll=GUIDE>.
Xu, Zhiwei et al., "Cluster and Grid Superservers: The Dawning Experiences in China", Institute of Computing Technology, Chinese Academy of Sciences, P.O. Box 2704, Beijing 100080, China. Proceedings of the 2001 IEEE International Conference on Cluster Computing. IEEE 2002.
Zeng, Daniel et al., "Efficient Web Content Delivery Using Proxy Caching Techniques", IEEE Transactions on Systems, Man, and Cybernetics—Part C: Applications and Reviews, vol. 34, No. 3, pp. 270-280, Aug. 2004.
Zhang, Qian et al., "Resource Allocation for Multimedia Streaming Over the Internet", IEEE Transactions on Multimedia, vol. 3, No. 3, pp. 339-355, Sep. 2001.
Chandra, Abhishek et al., "Quantifying the Benefits of Resource Multiplexing in On-Demand Data Centers", Department of Computer Science, University of Massachusetts Amherst, 2003.
J. Rolia, S. Singhal, and R. Friedrich, "Adaptive Internet data centers", In *Proceedings of the International Conference on Advances in Infrastructure for Electronic Business, Science, and Education on the Internet (SSGRR '00)*, Jul. 2000.
Jeffrey S. Chase, David E. Irwin, Laura E. Grit, Justin D. Moore, Sara E. Sprenkle, "Dynamic Virtual Clusters in a Grid Site Manager", In *Proceedings of the 12th IEEE International Symposium on High Performance Distributed Computing (HPDC'03)*, p. 90, Jun. 2003.
R. Doyle, J. Chase, O. Asad, W. Jin, and A. Vahdat, "Model-Based Resource Provisioning in a Web Service Utility", In *Proceedings of the Fourth USENIX Symposium on Internet Technologies and Systems (USITS)*, Mar. 2003.
L. Bradford, S. Milliner, and M. Dumas, "Experience Using a Coordination-based Architecture for Adaptive Web Content Provision", In *COORDINATION*, pp. 140-156. Springer, 2005.
S. Ranjan, J. Rolia, H. Fu, and E. Knightly, "QoS-driven Server Migration for Internet Data Centers", In *Proceedings of the Tenth International Workshop on Quality of Service (IWQoS* 2002), May 2002.
Russell, Clark, et al., "Providing Scalable Web Service Using Multicast Delivery", College of Computing, Georgia Institute of Technology, Atlanta, GA 30332-0280, 1995.
Reed, Daniel et al., "The Next Frontier: Interactive and Closed Loop Performance Steering", Department of Computer Science, University of Illinois, Urbana, Illinois 61801, International Conference on Parallel Processing Workshop, 1996.
Bian, Qiyong, et al., "Dynamic Flow Switching, A New Communication Service for ATM Networks", 1997.
Feldmann, Anja, et al., "Reducing Overhead in Flow-Switched Networks: An Empirical Study of Web Traffic", AT&T Labs—Research, Florham Park, NJ, 1998.
Feldmann, Anja, et al., "Efficient Policies for Carrying Web Traffic Over Flow-Switched Networks", IEEE/ACM Transactions on Networking, vol. 6, No. 6, Dec. 1998.
Feng, Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000.
Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170. Apr. 2000.
Fan, Li, et al., "Summary Cache: A Scalable Wide-Area Web Cache Sharing Protocol", IEEE/ACM Transactions on networking, vol. 8, No. 3, Jun. 2000.
Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C.. 2000.
Appleby, K., et. al., "Oceano-SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001.
Abdelzaher, Tarek, et al., "Performance Guarantees for Web Server End-Systems: A Control-Theoretical Approach", IEEE Transactions on Parallel and Distributed Systems, vol. 13, No. 1, Jan. 2002.
Garg, Rahul, et al., "A SLA Framework for QoS Provisioning and Dynamic Capacity Allocation", 2002.
Xu, Jun, et al., "Sustaining Availability of Web Services under Distributed Denial of Service Attacks", IEEE Transactions on Computers, vol. 52, No. 2, pp. 195-208, Feb. 2003.
McCann, Julie, et al., "Patia: Adaptive Distributed Webserver (A Position Paper)", Department of Computing, Imperial College London, SW1 2BZ, UK. 2003.
Urgaonkar, Bhuvan, et al., "Sharc: Managing CPU and Network Bandwidth in Shared Clusters", IEEE Transactions on Parallel and Distributed Systems, vol. 15, No. 1, pp. 2-17, Jan. 2004.
Liao, Raymond, et al., "Dynamic Core Provisioning for Quantitative Differentiated Services", IEEE/ACM Transactions on Networking, vol. 12, No. 3, pp. 429-442, Jun. 2004.
L. Amini, A. Shaikh, and H. Schulzrinne, "Effective Peering for Multi-provider Content Delivery Services", In *Proceedings of 23rd Annual IEEE Conference on Computer Communications (INFOCOM'04)*, pp. 850-861, 2004.
Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005.
M. Devarakonda, V.K. Naik, N. Rajamanim, "Policy-based multi-datacenter resource management", In *6th IEEE International Workshop on Policies for Distributed Systems and Networks*, pp. 247-250, Jun. 2005.
Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005.
Braumandl, R. et al., "ObjectGlobe: Ubiquitous query processing on the Internet", Universitat Passau, Lehrstuhl fur Informatik, 94030 Passau, Germany. Technische Universitat Munchen, Institut fur Informatik, 81667 Munchen, Germany. Edited by F. Casati, M.-C. Shan, D. Georgakopoulos. Received: Oct. 30, 2000 / Accepted: Mar. 14, 2001.Published online: Jun. 7, 2001—_c Springer-Verlag 2001.

(56) References Cited

OTHER PUBLICATIONS

K. Shen, L. Chu, and T. Yang, "Supporting Cluster-based Network Services on Functionally Symmetric Software Architecture", In *Proceedings of the ACM/IEEE SC2004 Conference*, Nov. 2004.
S. Benker, I. Brandic, G. Engelbrecht, R. Schmidt, "VGE—A Service-Oriented Grid Environment for On-Demand Supercomputing", In *Proceedings of the Fifth IEEE/ACM International Workshop on Grid Computing (GRID'04)*, Pittsburgh, PA, USA, Nov. 2004.
Y. Amir and D. Shaw, "WALRUS—A Low Latency, High Throughput Web Service Using Internet-wide Replication", In *Proceedings of the $19^{th}$ International Conference on Distributed Computing Systems Workshop*, 1998.
K. Azuma, T. Okamoto, G. Hasegawa, and M. Murata, "Design, Implementation and Evaluation of Resource Management System for Internet Servers", IOS Press, *Journal of High Speed Networks*, vol. 14 Issue 4, pp. 301-316, Oct. 2005.
Baentsch, Michael et al., "World Wide Web Caching: The Application-Level View of the Internet", Communications Magazine, IEEE, vol. 35, Issue 6, pp. 170-178, Jun. 1997.
Banga, Gaurav et al., "Resource Containers: A New Facility for Resource Management in Server Systems", Rice University, originally published in the Proceedings of the $3^{rd}$ Symposium on Operating Systems Design and Implementation, New Orleans, Louisiana, Feb. 1999.
Belloum, A. et al., "A Scalable Web Server Architecture", World Wide Web: Internet and Web Information Systems, 5, 5-23, 2002 Kluwer Academic Publishers. Manufactured in the Netherlands. 2000.
Cardellini, Valeria et al., "Geographic Load Balancing for Scalable Distributed Web Systems", Proceedings of the 8th International Symposium on Modeling, Analysis and Simulation of Computer and Telecommunication Systems, pp. 20-27. 2000.
E. Casalicchio and S. Tucci, "Static and Dynamic Scheduling Algorithms for Scalable Web Server Farm", In *Proceedings of the IEEE $9^{th}$ Euromicro Workshop on Parallel and Distributed Processing*, pp. 369-376, 2001.
J. Chase, D. Irwin, L. Grit, J. Moore and S. Sprenkle, "Dynamic Virtual Clusters in a Grid Site Manager", In *Proceedings of the $12^{th}$ IEEE International Symposium on High Performance Distributed Computing*, pp. 90-100, 2003.
Chawla, Hamesh et al., "HydraNet: Network Support for Scaling of Large-Scale Services", Proceedings of the 7th International Conference on *Computer Communications and Networks, 1998.* Oct. 1998.
Chen, Xiangping et al., "Performance Evaluation of Service Differentiating Internet Servers", IEEE Transactions on Computers, vol. 51, No. 11, pp. 1368-1375, Nov. 2002.
Chu, Wesley et al., "Taks Allocation and Precedence Relations for Distributed Real-Time Systems", IEEE Transactions on Computers, vol. C-36, No. 6, pp. 667-679. Jun. 1987.
M. Clarke and G. Coulson, "An Architecture for Dynamically Extensible Operating Systems", In *Proceedings of the 4th International Conference on Configurable Distributed Systems (ICCDS '98)*, Annapolis, MD, May 1998.
M. Colajanni, P. Yu, V. Cardellini, M. Papazoglou, M. Takizawa, B. Cramer and S. Chanson, "Dynamic Load Balancing in Geographically Distributed Heterogeneous Web Servers", In *Proceedings of the $18^{th}$ International Conference on Distributed Computing Systems*, pp. 295-302, May 1998.
Colajanni, Michele et al., "Analysis of Task Assignment Policies in Scalable Distributed Web-server Systems", IEEE Transactions on Parallel and Distributed Systes, vol. 9, No. 6, Jun. 1998.
Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004.

Dilley, John, et al., "Globally Distributed Content Delivery", IEEE Internet Computing, 1089-7801/02/$17.00 © 2002 IEEE, pp. 50-58, Sep.-Oct. 2002.
Ercetin, Ozgur et al., "Market-Based Resource Allocation for Content Delivery in the Internet", IEEE Transactions on Computers, vol. 52, No. 12, pp. 1573-1585, Dec. 2003.
Fong, L.L. et al., "Dynamic Resource Management in an eUtility", IBM T. J. Watson Research Center, 0-7803-7382-0/02/$17.00 © 2002 IEEE.
Foster, Ian et al., "The Anatomy of the Grid—Enabling Scalable Virtual Organizations", To appear: Intl J. Supercomputer Applications, 2001.
Gayek, P., et al., "A Web Content Serving Utility", IBM Systems Journal, vol. 43, No. 1, pp. 43-63. 2004.
Genova, Zornitza et al., "Challenges in URL Switching for Implementing Globally Distributed Web Sites", Department of Computer Science and Engineering, University of South Florida, Tampa, Florida 33620. 0-7695-077 I-9/00 $10.00—IEEE. 2000.
J. Guo, L. Bhuyan, R. Kumar and S. Basu, "QoS Aware Job Scheduling in a Cluster-Based Web Server for Multimedia Applications", In *Proceedings of the $19^{th}$ IEEE International Parallel and Distributed Processing Symposium (IPDPS'05)*, Apr. 2005.
Hu, E.C. et al., "Adaptive Fast Path Architecture", Copyright 2001 by International Business Machines Corporation, pp. 191-206, IBM J. Res. & Dev. vol. 45 No. 2 Mar. 2001.
C. Huang, S. Sebastine and T. Abdelzaher, "An Architecture for Real-Time Active Content Distribution", In *Proceedings of the $16^{th}$ Euromicro Conference on Real-Time Systems (ECRTS 04)*, pp. 271-280, 2004.
Jann, Joefon et al., "Web Applications and Dynamic Reconfiguration in UNIX Servers", IBM, Thomos J. Watson Research Center, Yorktown' Heights, New York 10598, 0-7803-7756-7/03/$17.00. 2003 IEEE. pp. 186-194.
Jiang, Xuxian et al., "SODA: A Service-On-Demand Architecture for Application Service Hosting Utility Platforms", Proceedings of the 12th IEEE International Symposium on High Performance Distributed Computing (HPDC'03) 1082-8907/03 $17.00 © 2003 IEEE.
Kant, Krishna et al., "Server Capacity Planning for Web Traffic Workload", IEEE Transactions on Knowledge and Data Engineering, vol. 11, No. 5, Sep./Oct. 1999, pp. 731-474.
R. Kapitza, F. J. Hauck, and H. P. Reiser, "Decentralized, Adaptive Services: The AspectIX Approach for a Flexible and Secure Grid Environment", In *Proceedings of the Grid Services Engineering and Management Conferences (GSEM*, Erfurt, Germany, Nov. 2004), pp. 107-118, LNCS 3270, Springer, 2004.
Koulopoulos, D. et al., "PLEIADES: An Internet-based parallel/distributed system", Software-Practice and Experience 2002; 32:1035-1049 (DOI: 10.1002/spe.468).
I. Kuz, P. Verkaik, M. van Steen and H. J. Sips, "A Distributed-Object Infrastructure for Corporate Websites", In *Proceedings IEEE Distributed Objects and Applications (DOA'00)*, Antwerp, pp. 165-176, 2000.
Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00. 2001 IEEE.
Mahon, Rob et al., "Cooperative Design in Grid Services", The 8th International Conference on Computer Supported Cooperative Work in Design Proceedings. pp. 406-412. IEEE 2003.
Montez, Carlos et al., "Implementing Quality of Service in Web Servers", LCMI—Depto de Automacao e Sistemas—Univ. Fed. de Santa Catarina, Caixa Postal 476-88040-900—Florianopolis—SC—Brasil, 1060-9857/02 $17.00. 2002 IEEE.
I. Haddad and E. Paquin, "MOSIX: A Cluster Load-Balancing Solution for Linux", In *Linux Journal*, vol. 2001 Issue 85es, Article No. 6, May 2001.
V. K. Naik, S. Sivasubramanian and S. Krishnan, "Adaptive Resource Sharing in a Web Services Environment", In *Proceedings of the 5th ACM/IFIP/USENIX International Conference on Middleware (Middleware '04)*, pp. 311-330, Springer-Verlag New York, Inc. New York, NY, USA, 2004.

(56) References Cited

OTHER PUBLICATIONS

S. Nakrani and C. Tovey, "On Honey Bees and Dynamic Server Allocation in Internet Hosting Centers", Adaptive Behavior, vol. 12, No. 3-4, pp. 223-240, Dec. 2004.
Abdelwahed, Sherif et al., "A Control-Based Framework for Self-Managing Distributed Computing Systems", *WOSS*'04 Oct. 31-Nov. 1, 2004 Newport Beach, CA, USA. Copyright 2004 ACM 1-58113-989-06/04/0010.
Aweya, James et al., "An adaptive load balancing scheme for web servers", International Journal of Network Management 2002; 12: 3-39 (DOI: 10.1002/nem.421), Copyright 2002 John Wiley & Sons, Ltd.
L. Chen and G. Agrawal, "Resource Allocation in a Middleware for Streaming Data", In *Proceedings of the 2nd Workshop on Middleware for Grid Computing (MGC '04)*, pp. 5-10, Toronto, Canada, Oct. 2004.
Workshop on Performance and Architecture of Web Servers (PAWS-2000) Jun. 17-18, 2000, Santa Clara, CA (Held in conjunction with SIGMETRICS-2000).
Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, Ilisia, Athens, 15784, Greece. *WWW10*, May 1-5, 2001, Hong Kong.
Fox, Armando et al., "Cluster-Based Scalable Network Services", University of California at Berkeley, SOSP-16 10/97 Saint-Malo, France, ACM 1997.
Chen, Thomas, "Increasing the Observability of Internet Behavior", Communications of the ACM, vol. 44, No. 1, pp. 93-98, Jan. 2001.
Shaikh, Anees et al., "Implementation of a Service Platform for Online Games", Network Software and Services, IBM T.J. Watson Research Center, Hawthorne, NY 10532, SIGCOMM'04 Workshops, Aug. 30 & Sep. 3, 2004, Portland, Oregon, USA. Copyright 2004 ACM.
Chellappa, Ramnath et al., "Managing Computing Resources in Active Intranets", International Journal of Network Management, 2002, 12:117-128 (DOI:10.1002/nem.427).
Lowell, David et al., "Devirtualizable Virtual Machines Enabling General, Single-Node, Online Maintenance", ASPLOS'04, Oct. 9-13, 2004, Boston, Massachusetts, USA. pp. 211-223, Copyright 2004 ACM.
K. Shen, H. Tang, T. Yang, and L. Chu, "Integrated Resource Management for Cluster-based Internet Services", In *Proceedings of the 5th Symposium on Operating Systems Design and Implementation (OSDI '02)*, pp. 225-238, Dec. 2002.
Cardellini, Valeria et al., "The State of the Art in Locally Distributed Web-Server Systems", ACM Computing Surveys, vol. 34, No. 2, Jun. 2002, pp. 263-311.
Grajcar, Martin, "Genetic List Scheduling Algorithm for Scheduling and Allocation on a Loosely Coupled Heterogeneous Multiprocessor System", Proceedings of the 36th annual ACM/IEEE Design Automation Conference, New Orleans, Louisiana, pp. 280-285. 1999.
Chandra, Abhishek et al., "Dynamic Resource Allocation for Shared Data Centers Using Online Measurements" Proceedings of the 11th international conference on Quality of service, Berkeley, CA, USA pp. 381-398. 2003.
Grimm, Robert et al., "System Support for Pervasive Applications", ACM Transactions on Computer Systems, vol. 22, No. 4, Nov. 2004, pp. 421-486.

Bent, Leeann et al., "Characterization of a Large Web Site Population with Implications for Content Delivery", *WWW2004*, May 17-22, 2004, New York, New York, USA ACM 1-58113-844-X/04/0005, pp. 522-533.
Pacifici, Giovanni et al., "Performance Management for Cluster Based Web Services", IBM TJ Watson Research Center, May 13, 2003.
Conti, Marco et al., "Quality of Service Issues in Internet Web Services", IEEE Transactions on Computers, vol. 51, No. 6, pp. 593-594, Jun. 2002.
Raunak, Mohammad et al., "Implications of Proxy Caching for Provisioning Networks and Servers", IEEE Journal on Selected Areas in Communications, vol. 20, No. 7, pp. 1276-1289, Sep. 2002.
Reumann, John et al., "Virtual Services: A New Abstraction for Server Consolidation", Proceedings of 2000 USENIX Annual Technical Conference, San Diego, California, Jun. 18-23, 2000.
J. Rolia, X. Zhu, and M. Arlitt, "Resource Access Management for a Utility Hosting Enterprise Applications", In *Proceedings of the 8th IFIP/IEEE International Symposium on Integrated Network Management (IM)*, pp. 549-562, Colorado Springs, Colorado, USA, Mar. 2003.
Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004.
Sacks, Lionel et al., "Active Robust Resource Management in Cluster Computing Using Policies", Journal of Network and Systems Management, vol. 11, No. 3, pp. 329-350, Sep. 2003.
Y.F. Sit, C.L. Wang, and F. Lau, "Cyclone: A High-Performance Cluster-based Web Server with Socket Cloning", *Cluster Computing* vol. 7 Issue 1, pp. 21-37, Kluwer Academic Publishers, Jul. 2004.
Sit, Yiu-Fai et al., "Socket Cloning for Cluster-BasedWeb Servers", Department of Computer Science and Information Systems, The University of Hong Kong, Proceedings of the IEEE International Conference on Cluster Computing, IEEE 2002.
Snell, Quinn et al., "An Enterprise-Based Grid Resource Management System", Brigham Young University, Provo, Utah 84602, Proceedings of the 11th IEEE International Symposium on High Performance Distributed Computing, 2002.
Tang, Wenting et al., "Load Distribution via Static Scheduling and Client Redirection for Replicated Web Server", Department of Computer Science and Engineering, 3115 Engineering Building, Michigan State University, East Lansing, MI 48824-1226, Proceedings of the 2000 International Workshop on Parallel Processing, pp. 127-133, IEEE 2000.
S. Taylor, M. Surridge, and D. Marvin, "Grid Resources for Industrial Applications", In *Proceedings of the IEEE International Conference on Web Services (ICWS 04)*, pp. 402-409, San Diego, California, Jul. 2004.
D.P. Vidyarthi, A. K. Tripathi, B. K. Sarker, A. Dhawan, and L. T. Yang, "Cluster-Based Multiple Task Allocation in Distributed Computing System", In *Proceedings of the 18th International Parallel and Distributed Processing Symposium (IPDPS'04)*, p. 239, Santa Fe, New Mexico, Apr. 2004.
D. Villela, P. Pradhan, and D. Rubenstein, "Provisioning Servers in the Application Tier for E-commerce Systems", In *Proceedings of the 12th IEEE International Workshop on Quality of Service (IWQoS '04)*, pp. 57-66, Jun. 2004.
Foster et al., "A Distributed Resource Management Architecture that Supports Advance Reservations and Co-Allocation," *Seventh International Workshop on Quality of Service (IWQoS '99)*, 1999, pp. 27-36.

\* cited by examiner

FIG. 4

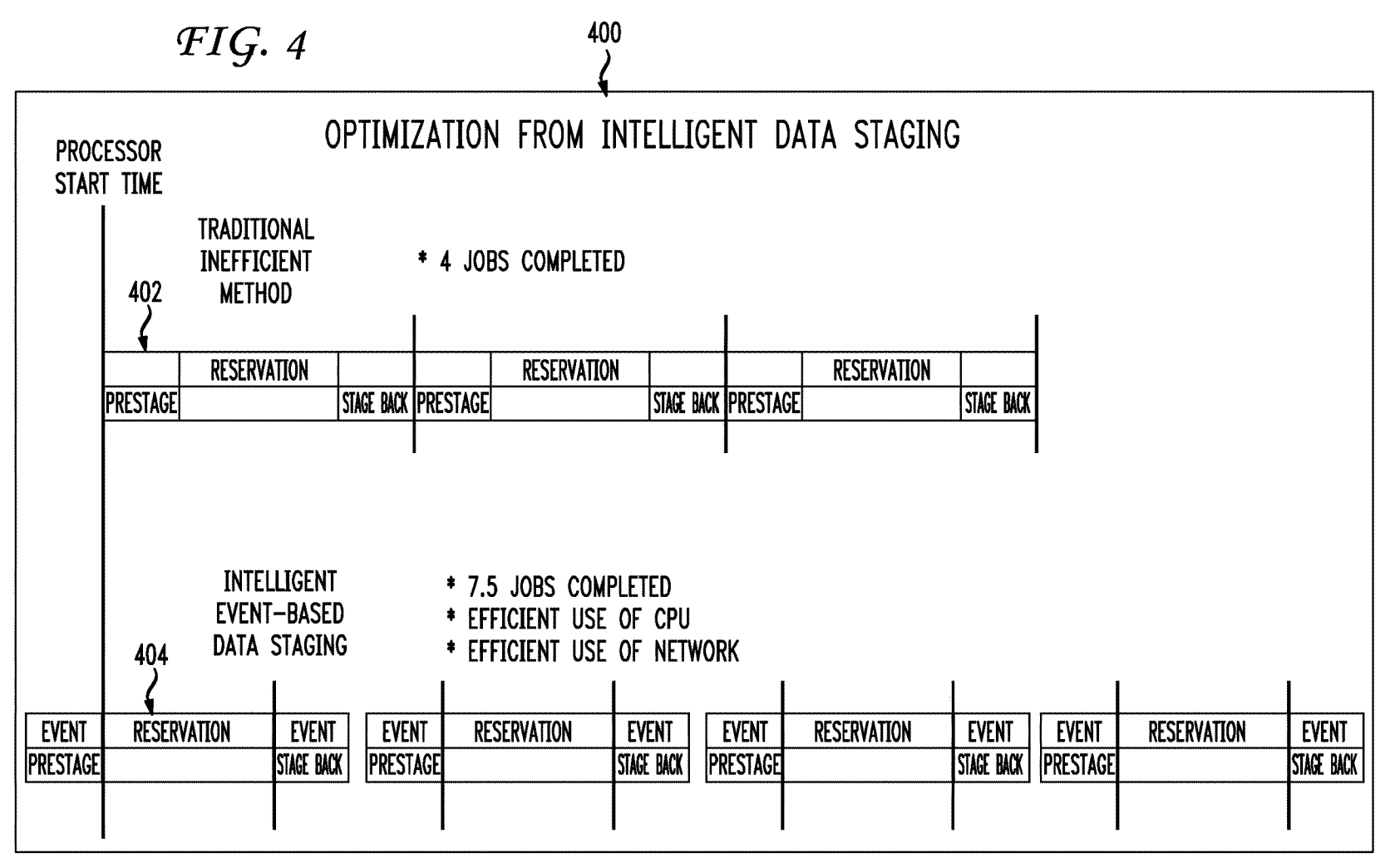

OPTIMIZATION FROM INTELLIGENT DATA STAGING

400

* 4 JOBS COMPLETED

* 7.5 JOBS COMPLETED
* EFFICIENT USE OF CPU
* EFFICIENT USE OF NETWORK

ON-DEMAND ACCESS TO COMPUTE RESOURCES

PRIORITY CLAIM

The present application is a continuation of U.S. patent application Ser. No. 11/279,007, filed Apr. 7, 2006, which claims priority to U.S. Provisional Application No. 60/669,278 filed Apr. 7, 2005, the contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

RELATED APPLICATIONS

The present application is related to U.S. patent application Ser. Nos. 11/276,852 11/276,853; 11/276,854; 11/276,855; and Ser. No. 11/276,856 all filed on 16 Mar., 2006. Each of these cases is incorporated herein by reference as well as the corresponding PCT Applications where applicable.

BACKGROUND

1. Technical Field

The present disclosure relates to an on-demand compute environment and more specifically to a system and method of providing access and use of on-demand compute resources from a local compute environment.

2. Introduction

Managers of clusters desire maximum return on investment, often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data to move between nodes. A cluster is one example of a compute environment. Other examples include a grid, which is loosely defined as a group of clusters, and a computer farm which is another organization of computers for processing.

Often a set of resources organized in a cluster or a grid can have jobs to be submitted to the resources that require more capability than the set of resources has available. In this regard, there is a need in the art for being able to easily, efficiently and on-demand utilize new resources or different resources to handle a job. The concept of "on-demand" compute resources has been developing in the high performance computing community recently. An on-demand computing environment enables companies to procure compute power for average demand and then contract remote processing power to help in peak loads or to offload all their compute needs to a remote facility.

Enabling capacity on demand in an easy-to-use manner is important to increasing the pervasiveness of hosting in an on-demand computing environment such as a high performance computing or data center environment. Several entities can provide a version of on-demand capability, but there still exists multi-hour or multi-delays in obtaining access to the environment. The delay is due to the inflexibility of transferring workload because the on-demand centers require participating parties to align to certain hardware, operating systems or resource manager environments. These requirements act as inhibitors to widespread adoption of the use of on-demand centers and make it too burdensome for potential customers to try out the service. Users must pay for unwanted or unexpected charges and costs to make the infrastructure changes for compatibility with the on-demand centers.

Often a set of resources organized in a cluster or a grid can have jobs to be submitted to the resources that require more capability than the set of resource has available. In this regard, there is a need in the art for being able to easily, efficiently and on-demand utilize new resources or different resources to handle a job. The concept of "on-demand" compute resources has been developing in the high performance computing community recently. An on-demand computing environment enables companies to procure compute power for average demand and then contract remote processing power to help in peak loads or to offload all their compute needs to a remote facility. Several reference books having background material related to on-demand computing or utility computing include Mike Ault, Madhu Tumma, Oracle 10 g Grid & Real Application Clusters, Rampant TechPress, 2004 and Guy Bunker, Darren Thomson, Delivering Utility Computing Business-driven IT Optimization, John Wiley & Sons Ltd, 2006.

In Bunker and Thompson, section 3.3 on page 32 is entitled "Connectivity: The Great Enabler" wherein they discuss how the interconnecting of computers will dramatically increase their usefulness. This disclosure addresses that issue. There exists in the art a need for improved solutions to enable communication and connectivity with an on-demand high performance computing center.

SUMMARY

Additional features and advantages of the disclosure will be set forth in the description which follows, and in part will be obvious from the description, or can be learned by practice of the disclosure. The features and advantages of the disclosure can be realized and obtained by means of the instruments and combinations particularly pointed out in the appended claims. These and other features of the present disclosure will become more fully apparent from the following description and appended claims, or can be learned by the practice of the disclosure as set forth herein.

The disclosure relates to systems, methods and computer-readable media for controlling and managing the identification and provisioning of resources within an on-demand center as well as the transfer of workload to the provisioned resources. One aspect involves creating a virtual private cluster via a reservation of resources within the on-demand center for the particular workload from a local environment. Various embodiments will be discussed next with reference to example methods which can be applicable to systems and computer-readable media.

One aspect relates to a method of managing resources between a local compute environment and an on-demand environment. The method includes detecting an event associated with a local compute environment and, based on the detected event, identifying information about the local environment, establishing a communication with an on-demand compute environment and transmitting the information about the local environment to the on-demand compute environment. The system, at a first time establishes an advanced reservation of resources in the on-demand compute environment to yield reserved resources. The timing of the advanced reservation is at a second time which is later than the first time. The system then provisions the reserved resources within the on-demand compute environment to substantially duplicate the local compute environment to yield provisional resources and transfers workload from the local compute environment to the reserved, provisional resources in the on-demand compute environment. The event can be a threshold associated with a job processing in the local compute environment or a triggering event within or outside of the local compute environment.

Another aspect of the disclosure provides for a method including generating at least one profile associated with workload that can be processed in a local compute environment, selecting at the local compute environment a profile from the at least one profile, communicating the selected profile from the local compute environment to the on-demand compute environment, reserving resources in the on-demand compute environment to yield reserved resources, provisioning the reserved resources within the on-demand compute environment according to the selected profile to yield provisional resources and transferring workload from the local-environment to the reserved, provisional resources in the on-demand compute environment.

The step of generating at least one profile associated with workload that can be processed in a compute environment can be performed in advance of receiving job requests on the local compute environment. Further, generating at least one profile associated with workload that can be processed in a compute environment can be performed dynamically as job requests are received on the local compute environment. There can be one or more profiles generated. Furthermore, one or more of the steps of the method can be performed after an operation from a user or an administrator, such as a one-click operation. Any profile of the generated at least one profile can relate to configuring resources that are different from available resources within the local compute environment.

Another aspect provides for a method of integrating an on-demand compute environment into a local compute environment. This method includes determining whether a backlog workload condition exists in the local compute environment and, if so, then analyzing the backlog workload, communicating information associated with the analysis to the on-demand compute environment, establishing an advanced reservation of resources in the on-demand compute environment to yield reserved resources, provisioning the reserved resources in the on-demand compute environment according to the analyzed backlog workload to yield provisional resources and transferring the backlog workload to the provisioned resources in the on-demand compute environment.

Yet another aspect of the disclosure relates to web servers. In this regard, a method of managing resources between a webserver and an on-demand compute environment includes determining whether web traffic directed to the webserver should be at least partially served via the on-demand compute environment, establishing an advanced reservation of resources in the on-demand compute environment to yield reserved resources, provisioning the reserved resources within the on-demand compute environment to enable it to respond to web traffic for the webserver and to yield provisional resources, establishing a routing of at least part of the web traffic from the webserver to the provisioned resources in the on-demand compute environment and communicating data between a client browser and the on-demand compute environment such that the use of the on-demand compute environment for the web traffic is transparent.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended documents and drawings. Understanding that these drawings depict only typical embodiments of the disclosure and are not therefore to be considered to be limiting of its scope, the disclosure will be described and explained with additional specificity and detail through the use of the accompanying drawings.

FIG. 4 illustrates optimization from intelligent data staging;

DETAILED DESCRIPTION

Various embodiments are discussed in detail below. While specific implementations are discussed, it should be understood that this is done for illustration purposes only. A person skilled in the relevant art will recognize that other components and configurations can be used without parting from the spirit and scope of the disclosure.

In order for hosting centers to obtain the maximum advantage, the hosting centers need to simplify the experience for potential customers, enable fine-grained control over the sharing of resources and also dynamically adjust what is being provided based on each customer's needs. Additional intelligence control optimizes the delivery of resources so that hosting centers can lower costs and provide competitive offerings that will more easily be adopted and used.

Figure 1:
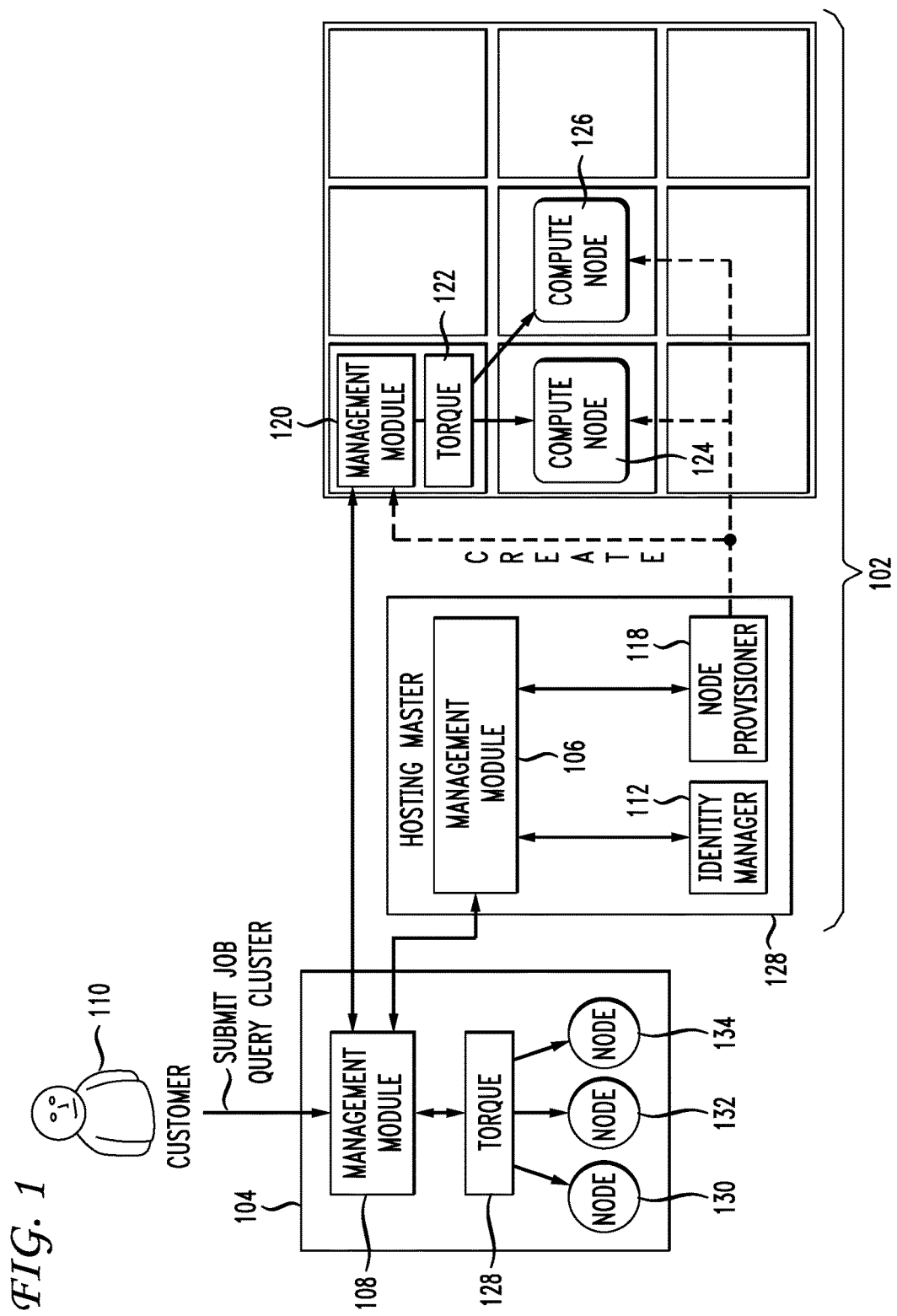
FIG. 1 illustrates the basic arrangement of the present disclosure.

This disclosure relates to the access and management of on-demand or utility computing resources at a hosting center. FIG. 1 illustrates the basic arrangement and interaction between a local compute environment 104 and an on-demand hosting center 102. The local compute environment can include a cluster, a grid, or any other variation of these types of multiple node and commonly managed environments. The on-demand hosting center or on-demand computing environment 102 includes one or more nodes that are available for reservation and provisioning, and preferably has a dedicated node containing a hosting master 128 which can include a slave management module 106 and/or at least one other module, such as the identity manager 112 and node provisioner 118.

Throughout the description, the terms software, workload manager (WM), management module, system and so forth can be used to refer generally to software that performs functions similar to one or more of the Moab™ products from Cluster Resources, Inc., but are certainly not limited to the exact implementation of Moab™ (for example, the Moab Workload Manager®, Moab Grid Monitor®, etc.). Generally, the term "WM" can be used to relate to software that performs the steps being discussed. Such software provides a service for optimization of a local compute environment and according to the principles of the disclosure can also be used to control access to on-demand resources. In terms of local environment control, the software provides an analysis into how & when local resources, such as software and hardware devices, are being used for the purposes of charge-back, planning, auditing, troubleshooting and reporting internally or externally. Such optimization enables the local environment to be tuned to get the most out of the resources in the local compute environment. However, there are times where more resources are needed than are available in the local environment. This is where the on-demand or hosting center can provide additional resources.

The software has detailed knowledge of jobs in a queue that will consume resources in a compute environment. The software schedules, at a first time, advanced reservations in the compute environment such that the reservation of resources is at a second time, later than the first time. For example, if a queue has ten jobs waiting, job number four can be analyzed with other jobs in the queue and the software establishes at noon an advanced reservation to run job number four at 2 PM. In this manner, when 2 PM arrives, job number four has resources already reserved (and have been for two hours), such that job number four will consume, at 2 PM, its reserved resources. FIG. 4, portion 404 illustrates advanced reservations in the future for jobs.

Typically, a hosting center 102 will have the following attributes. It allows an organization to provide resources or services to customers where the resources or services are custom-tailored to the needs of the customer. Supporting true utility computing usually requires creating a hosting center 102 with one or more capabilities as follows: use of advanced reservations; secure remote access; guaranteed resource availability at a fixed time or series of times; integrated auditing, accounting, and billing services; tiered service level (QoS/SLA) based resource access; dynamic compute node provisioning; full environment management over compute, network, storage, and application/service based resources; intelligent workload optimization; high availability; failure recovery; and automated re-allocation.

A management module 108 enables utility computing by allowing compute resources to be reserved, allocated, and dynamically provisioned to meet the needs of internal or external workload. The management module reserves at a first time specific resources in the environment (local or on-demand) for each job in an access control list. The jobs consume the reserved resources at a second time which is later than the first time. For example, a management module may establish at 1 PM (a first time), an advanced reservation for resources at 4 PM (a second time which is later than a first time). This yields reserved resources (in the local or on-demand environment) which will be consumed by workload at the second time, i.e., workload will flow to the reserved resources for use at the appointed time and consume the resources then. The module 108, 122 knows how the compute environment will be used in the future because each job in a queue has its own reservation of resources and, therefore, the system knows what the workload use will be at any given time. This is distinguishable from a load balancing approach which does not reserve resources for future use. Thus, at peak workload times or based on some other criteria, the local compute environment does not need to be built out with peak usage in mind. As periodic peak resources are required, triggers can cause overflow to the on-demand environment and thus save money for the customer. The module 108 is able to respond to either manual or automatically generated requests and can guarantee resource availability subject to existing service level agreement (SLA) or quality of service (QOS) based arrangements. As an example, FIG. 1 shows a user 110 submitting a job or a query to the cluster or local environment 104. The local environment will typically be a cluster or a grid with local workload. Jobs can be submitted which have explicit resource requirements and will each have an established reservation. Workload can have explicit requirements. The local environment 104 will have various attributes such as operating systems, architecture, network types, applications, software, bandwidth capabilities, etc., which are expected by the job implicitly. In other words, jobs will typically expect that the local environment will have certain attributes that will enable it to consume resources in an expected way. These expected attributes can be duplicated or substantially duplicated in an on-demand environment, or substitute resources (which can be an improvement or less optimal) can be provisioned in the on-demand environment. When accessing the on-demand compute environment, the management module will reserve the necessary resources in the on-demand environment to prepare for the overflow of workload. An example of a duplicated or substantially duplicated environment is when the local environment utilizes Pentium CPUs and the Linux v.2 Operating System. The on-demand center may reserve and provision AMD CPUs or Pentium CPUs and Linux v.3 Operating Systems. Thus, the version of Linux is not exactly the same as in the local environment and is not sufficient to meet the affinity requests of the workload that will be transferred.

Other software is shown by way of example in a distributed resource manager such as Torque 128 and various nodes 130, 132 and 134. The management modules (both master and/or slave) can interact and operate with any resource manager, such as Torque, LSF, SGE, PBS and LoadLeveler and are agnostic in this regard. Those of skill in the art will recognize these different distributed resource manager software packages.

A hosting master or hosting management module 106 can also be an instance of a Moab™ software product with hosting center capabilities to enable an organization to dynamically control network, advanced reservation, compute, application, and storage resources and to dynamically reserve and provision operating systems, security, credentials, and other aspects of a complete end-to-end compute environment. Module 106 is responsible for knowing all the policies, guarantees, promises and also for managing the provisioning of resources within the utility computing space 102. In one sense, module 106 can be referred to as the "master" module in that it couples and needs to know all of the information associated with both the utility environment and the local environment. However, in another sense it can be referred to as the slave module or provisioning broker wherein it takes instructions from the customer management module 108 for provisioning resources and builds whatever environment is requested in the on-demand center 102. A slave module would have none of its own local policies but rather follows all requests from another management module. For example, when module 106 is the slave module, then a master module 108 would submit automated or manual (via an administrator or user) requests that the slave module 106 simply follows to manage the reservations of and build out of the requested environment. Thus, for both IT and end users, a single easily usable interface can increase efficiency; reduce costs, including management costs; and improve investments in the local customer environment. The interface to the local environment, which also has the access to the on-demand environment, can be a web-interface or an access portal. Restrictions of feasibility only can exist. The customer module 108 would have rights and ownership of all resources. The reserved and allocated resources would not be shared, but would be dedicated to the requestor. As the slave module 106 follows all directions from the master module 108, any policy restrictions will preferably occur on the master module 108 in the local environment.

The modules also provide data management services that simplify adding resources from across a local environment. For example, if the local environment includes a wide area network, the management module 108 provides a security model that ensures, when the environment dictates, that administrators can rely on the system even when untrusted resources at the certain level have been added to the local environment or the on-demand environment. In addition, the management modules comply with n-tier web services based architectures and therefore, scalability and reporting are inherent parts of the system. A system operating according to the principles set forth herein also has the ability to track, record and archive information about jobs or other processes that have been run on the system.

A hosting center 102 provides scheduled dedicated resources to customers for various purposes and typically has a number of key attributes: secure remote access, guaranteed resource availability at a fixed time or series of times, tightly integrated auditing/accounting services, varying quality of service levels providing privileged access to a set of users, node image management allowing the hosting center to restore an exact customer-specific image before enabling access. Resources available to a module 106, which can also be referred to as a provider resource broker, will have both rigid (architecture, RAM, local disk space, etc.) and flexible (OS, queues, installed applications etc.) attributes. The provider or on-demand resource broker 106 can typically provision (dynamically modify) flexible attributes, but not rigid attributes. The provider broker 106 can possess multiple resources, each with different types with rigid attributes (i.e., single processor and dual processor nodes, Intel nodes, AMD nodes, nodes with 512 MB RAM, nodes with 1 GB RAM, etc).

This combination of attributes presents unique constraints on a management system. Described herein are how the management modules 108 and 106 are able to effectively manage, modify, reserve, and provision resources in this environment and provide full array of services on top of these resources. The management modules' 108, 120 advanced reservation and policy management tools provide support for the establishment of extensive service level agreements, automated billing, and instant chart and report creation. By knowing the list of jobs to be run in the local/on-demand compute environments, the management modules can make, at a first time, reservations for future consumption of resources at a second time, which is later than the first time, by the jobs and more intelligently know what the resource usage will be in the future, thus allowing the system to know, for example, that the local environment will need on-demand resources in an hour. Thus, as shown in FIG. 1, the system can reserve, provision and use resources in the on-demand center for overflow workload from the local compute environment. Each job has an allocated reservation of resources for those resources it will consume when the job is transferred into the compute environment.

Utility-based computing technology allows a hosting center 102 to quickly harness existing compute resources, dynamically co-allocate the resources, and automatically provision them into a seamless virtual cluster. U.S. application Ser. No. 11/276,852 incorporated herein by reference above, discloses a virtual private cluster (VPC). The process involves aggregating compute resources and establishing partitions of the aggregated compute resources. Then the system presents only the partitioned resources accessible by an organization to use within the organization. Thus, in the on-demand center 102, as resources are needed, the control and establishment of an environment for workload from a local environment can occur via the means of creating, via reservations, a virtual private cluster for the local user workload within reserved, provisioned resources in the on-demand compute environment 120. Note that further details regarding the creation and use of VPCs are found in the '852 application. In each case discussed herein where on-demand compute resources are identified, reserved, provisioned and consumed by local environment workload, the means by which this is accomplished can be through the creation of a VPC within the on-demand center.

Also shown in FIG. 1 are several other components such as an identity manager 112 and a node provisioner 118 as part of the hosting center 102. The hosting master 128 can include an identity manager interface 112 that can coordinate global and local information regarding users, groups, accounts, and classes associated with compute resources. The identity manager interface 112 can also allow the management module 106 to automatically and dynamically create and modify user accounts and credential attributes according to current workload needs. The hosting master 128 allows sites extensive flexibility when it comes to defining credential access, attributes, and relationships. In most cases, use of the USERCFG, GROUPCFG, ACCOUNTCFG, CLASSCFG, and QOSCFG parameters is adequate to specify the needed configuration. However, in certain cases, such as the following, this approach is not ideal or even adequate: environments with very large user sets; environments with very dynamic credential configurations in terms of fairshare targets, priorities, service access constraints, and credential relationships; grid environments with external credential mapping information services; enterprise environments with fairness policies based on multi-cluster usage.

The modules 108, 106, 120 address these and similar issues through the use of the identity manager 112. The identity manager 112 allows the module to exchange information with an external identity management service. As with the module's resource manager interfaces, this service can be a full commercial package designed for this purpose, or something far simpler by which the module obtains the needed information for a web service, text file, or database.

Next, attention is turned to the node provisioner 118. As an example of its operation, the node provisioner 118 can enable the allocation of resources in the hosting center 102 for workload from a local compute environment 104. As mentioned above, one aspect of this process can be to create a VPC within the hosting center as directed by the module 108. Reservations of resources in the hosting center are used to create the VPC, or to reserve resources in the on-demand compute environment that can be provisioned on the VPC. The customer management module 108 will communicate with the hosting management module 106 to begin the provisioning process. In one aspect, the provisioning module 118 can generate another instance of necessary management software 120 and 122 which will be created in the hosting center environment as well as compute nodes 124 and 126 to be consumed by a submitted job at the time of their reservation. The new management module 120 is created on the fly, can be associated with a specific request and will preferably be operative on a dedicated node. If the new management module 120 is associated with a specific request or job, as the job consumes the reserved resources associated with the provisioned compute nodes 124, 126, and the job completes, then the system can remove the management module 120 since it was only created for the specific request. The new management module 120 can connect to other modules such as module 108. The module 120 does not necessarily have to be created but can be generated on the fly as necessary to assist in communication, reservations, and provisioning and use of the resources in the utility environment 102. For example, the module 106 can go ahead and reserve and allocate nodes within the utility computing environment 102 and connect these nodes directly to module 108 but in that case you can lose some batch ability as a tradeoff. The hosting master 128 having the management module 106, identity manager 112 and node provisioner 118 preferably is co-located with the utility computing environment but can be distributed. The management module 108 on the local environment 104 can then communicate directly with the created management module 120 in the hosting center 102 to manage the transfer of workload and consumption of on-demand center resources. Created management module 120 can be part of a VPC.

Figure 2:
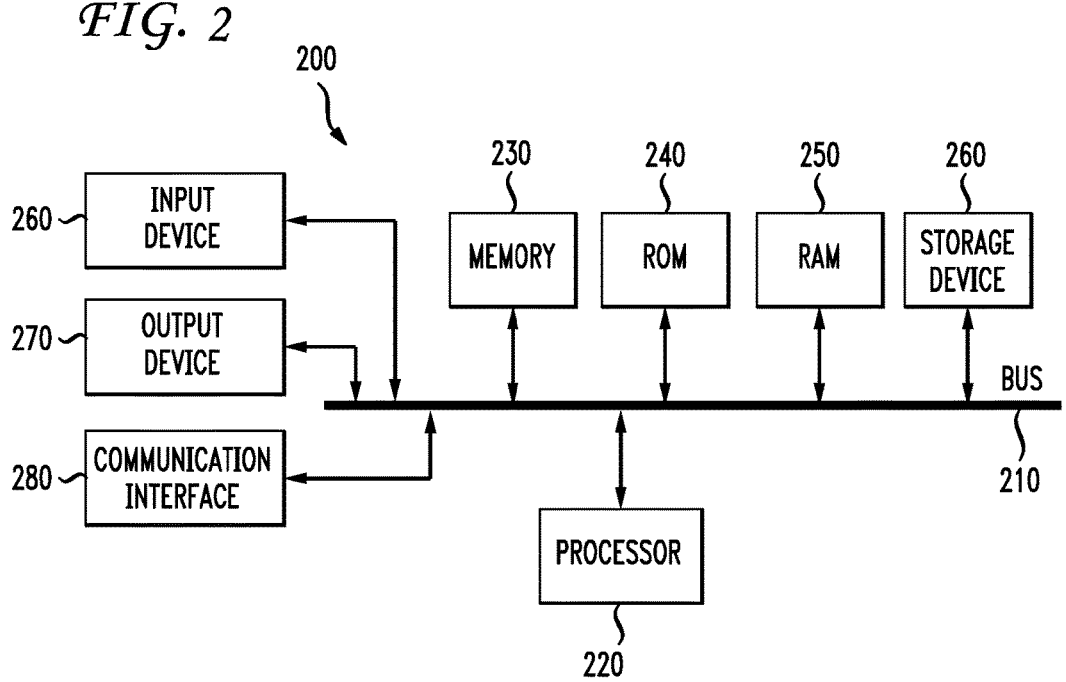
FIG. 2 illustrates the basic hardware components according to an embodiment of the disclosure.

With reference to FIG. 2, an exemplary system for implementing the disclosure includes a general purpose computing device 200, including a processing unit (CPU) 220, a system memory 230, and a system bus 210 that couples various system components including the system memory 230 to the processing unit 220. The system bus 210 can be any of several types of bus structures including a memory bus or memory controller, a peripheral bus, and a local bus using any of a variety of bus architectures. The system can also include other memory such as read only memory (ROM) 240. A basic input/output (BIOS), containing the basic routine that helps to transfer information between elements within the computing device 200, such as during start-up, is typically stored in ROM 240. The computing device 200 further includes storage means such as a hard disk drive 250, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that is accessible by a computer, such as magnetic cassettes, flash memory cards, digital video disks, memory cartridges, random access memories (RAMs) read only memory (ROM), and the like, can also be used in the exemplary operating environment. The system above provides an example server or computing device that can be utilized and networked with a cluster, clusters or a grid to manage the resources according to the principles set forth herein. It is also recognized that other hardware configurations can be developed in the future upon which the method can be operable.

Figure 3:
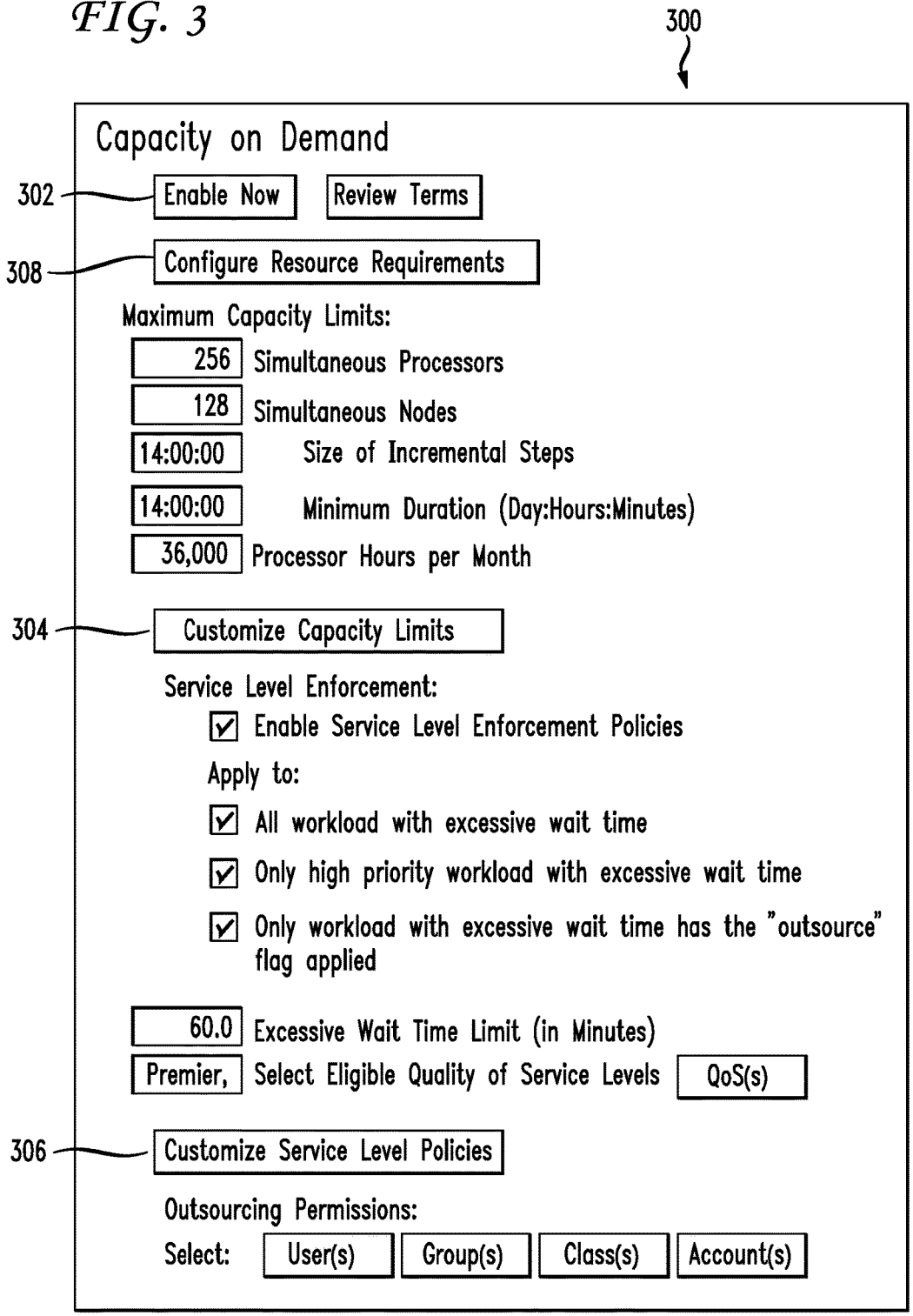
FIG. 3 illustrates an example graphical interface for use in obtaining on-demand resources.

As mentioned a concept useful but not necessary for enabling the technology include an easy-to-use capacity on-demand feature and dynamic VPCs. U.S. patent application Ser. No. 11/276,852 filed 16 Mar. 2006 referenced above provide further details regarding VPCs and the capability is enabled in the incorporated source code in the parent provisional application. Regarding the easy-to-use capacity on demand, FIG. 3 illustrates an example interface 300 that a user can utilize to connect to an on-demand center by a simple configuration of several parameters on each site. These parameters can be pre-configured and activated in a manner as simple as using an "enable now" button 302. Preferably, license terms and agreement can be prepackaged or accepted with the software's other licenses during an installation process or can be reviewed via a web form as a response to activating the service. The administrator can configure the resource requirements 308 in the on-demand center easily to control how many simultaneous processors, nodes, and so forth can be reserved and used in the on-demand center. Other parameters can be set such as the size of incremental steps, minimum duration and processor hours per month. The interface 300 also includes example capabilities such as customizing capacity limits 304, customizing service level policies 306 and other outsourcing permissions. For example, the user can vary the permissions of users, groups, classes and accounts with outsourcing permissions.

As can be seen in interface 300, there are other parameters shown such as maximum capacity and service level limits, and wall time limits and quality of service levels. Thus a user can provide for a customized approach to utilizing the on-demand center. The user can enable service level enforcement policies and apply the policies to various gradations of the workload, such as to all workload with excessive wait times, only high priority workload with excessive wait time and/or only workload with excessive wait time that has the outsource flag applied. Other gradations are also contemplated, such as enabling the user to further define "excessive" wait time or how high the high priority workload is.

The dynamic VPC enables for the packaging, securing, optimizing and guaranteeing of the right resource delivery in cluster, grid and hosting center environments. The VPC is used to virtually partition multiple types of resources (such as different hardware resources, software licenses, VLANs, storage, etc.) into units that can be treated as independent clusters. These independent virtual clusters can have their own policy controls, security, resource guarantees, optimization, billing and reporting. The VPC uses the management software's scheduling, reservation and policy controls to automatically change the virtual boundaries to match the required resources to the associated workload. For example, if a client first needed resources from a traditional Linux compute farm, but then over time had workload that increasingly needed SMP resources, the dynamic VPC could optimally adapt the correct resources to match the workload requirements. The dynamic VPC provides flexibility to manage and modify the resources in the on-demand center. Otherwise, the hosting services are too rigid, causing clients to go through the tasks of redefining and renegotiating which resources are provided or causing them to pay for resources that didn't match their changing needs.

Other differentiators enabled in the management software include detailed knowledge and fine grained control of workload which includes workload allocation (CPU vs. data intensive workload), optimized data staging, resource affinity, highly optimized resource co-allocation, provisioning integration, and integration security management. Service level enforcement controls relate to guaranteed response times and guaranteed uptime. There are broad management capabilities such as multi-resource manager support and flexibility in management modules such as single system images. More details about these features follow.

Regarding workload allocation, one of the intelligence capabilities enabled by the detailed knowledge and control over workload is its ability to differentiate between CPU-intensive and data-intensive workload. When the software schedules, via advanced reservations, HPC workload for a hosting center, it can automatically send the more CPU-intensive workload to the hosting site, while focusing the data-intensive workload locally. This means that jobs with large data files do not need to tie up networks, and the approach reduces the total response time of the clients' workload. Clients are more satisfied because their work gets done sooner and the hosting center is more satisfied because it can process workload that is most profitable to the "CPU Hour" billing model.

Optimized data staging is another aspect of the software's detailed knowledge and control of workload. This technology increases the performance of data-intensive workload by breaking a job's reservation into the two, three (or more) elements of pre-staging data, processing workload and staging results back. Each job in a queue can have its own reservation of resources such that the software has detailed knowledge of resources that will be consumed in the future for jobs in the queue. Other scheduling technologies reserve the processor and other resources on a node for the duration of all three, leaving the CPU idle during data staging and the I/O capacity virtually idle during the processing period. The management software of the present disclosure has an information querying service that analyzes both file and network information services and then intelligently schedules all two or three processes in an optimized manner. The I/O capacity is scheduled, via advanced reservations, to avoid conflict between data staging periods, and CPU scheduling is optimized to allow for the most complete use of the underlying processor. Once again, this assists the end client in getting more accomplished in a shorter period of time, and optimizes the hosting providers' resources to avoid idle CPU time. FIG. 4 illustrates how intelligent data staging works. The top portion 402 of this figure shows the traditional method of reserving an entire node, including the CPU, for the entire data staging, compute time, and staging back. The top row of the top portion 402 shows CPU usage and blank spaces reporting idle CPU time. The bottom row shows I/O capacity being used for pre-staging and staging back, but idle during CPU usage. As is shown in FIG. 4, the top portion 402 only completes three jobs. The bottom half 404 shows how the management module schedules reservations such that the data staging and processing overlap and thus optimize workload. The "events" utilize the CPU during the prestaging and stage back periods rather than leaving the CPU idle during those times. In portion 404, 7.5 jobs are shown as being completed via the reservations and "events," which can be CPU time reserved for other jobs. This provides efficient use of CPU cycle and network resources. Row 404 illustrates how reservations exist in a compute environment over time (on the horizontal axis). Four reservations are established for four jobs and eight events are shown as also filling in CPU time during prestaging and staging back. Thus, other jobs can fill the CPU available time reserved by the "events."

Regarding resource affinity, the management module 108, 120 leverages its detailed knowledge of workload requests and reservations in the compute environment, by applying jobs to the resource type able to provide the fastest response time. For example, if a job is likely to run faster on AIX over Linux, on an SMP system as opposed to a traditional CPU farm, or performs better on a specific network type, such affinities can be configured manually or set automatically to occur so that workload is optimized. The management modules 108, 120 also have the capability to track these variables and apply higher charge rates to those using the more costly systems.

The management modules 108, 120 associate workload requests with service level enforcement controls, such as guaranteeing response time and guaranteeing uptime. This is accomplished through intelligent use of advanced reservations. It is noted that on-demand high performance computing centers can therefore manage service level enforcement, or else their clientele will never repeat business. An application of this capability includes setting rules that automatically push all of a site's backlogged workload over to a hosting center. This capability can be referred to as workload surge protection. The advanced scheduling algorithms and policy management capabilities can be set to meet these needs by reserving resources in the hosting center for the backlogged workload overflow. Below are sample industries that have specific needs for such guarantees: Homeland Security (guarantee response times, as well as guarantee uptime, workload surge protection); and National Institute of Health (desires the software guarantee resources in the event of a national crisis, up to the point of preempting all other jobs across the entire grid). This feature, called "Run Now," provides the required guaranteed immediate response time. To do so it performs a host of complex queries to provide the response time at the lowest possible cost to participating sites. The software can achieve this by running through more than 8 levels (any number can apply) of increasingly aggressive policies to provide the resources—starting with the least impacting levels and fully exhausting its options prior to increasing to the next more aggressive level. Similarly, the software's intelligence allows hosting sites to provide promised SLA levels that keep the client fully satisfied, while providing the highest possible return to the hosting provider; multi-media-film, gaming, simulation and other rendering intense areas (guarantee response time); oil & gas (guarantee response time, workload surge protection); Aerospace (guarantee response time); Financial (guarantee uptime and guarantee response time, workload surge protection); Manufacturers—Pharmaceuticals, Auto, Chip and other "First to Market" intense industries (guarantee response time, workload surge protection). As can be seen, the software provides features applicable in many markets.

Another feature relates to the software's architecture which allows for simultaneous monitoring, reserving, scheduling, and managing of multiple resource types, and can be deployed across different environments or used as a central point of connection for distinct environments. Regarding the broad compatibility, the software's server-side elements work on at least Linux, Unix and Mac OS X environments (it can manage Linux, Unix, Mac OS X, Windows and mainframe environments—depending on what the local resource manager supports). The client-side software works on Linux, Unix, Mac OS X and Windows environments as well as other environments.

Multi-resource manager support enables the software to work across virtually all mainstream compute resource managers. These compute resource managers include, but are not limited to, LoadLeveler, LSF, PBSPro, TORQUE, OpenPBS and others. Not only does this increase the number of environments in which it can be used to provide capacity on demand capabilities, but it leaves the customer with a larger set of options going forward because it doesn't lock them into one particular vendor's solution. Also, with multi-resource manager support, the software can interoperate with multiple compute resource managers at the same time, thus allowing grid capabilities even in mixed environments.

Beyond the traditional compute resource manager that manages job submission to compute nodes, the software can integrate with storage resource managers, network resource managers, software license resource managers, etc. It uses this multiplicity of information sources to make its policy decisions more effective. The software can also connect up to hardware monitors such as Ganglia, custom scripts, executables and databases to get additional information that most local compute resource managers would not have available. This additional information can be queried and evaluated by the software or an administrator to be applied to workload reservation and placement decisions and other system policies.

Figure 5:
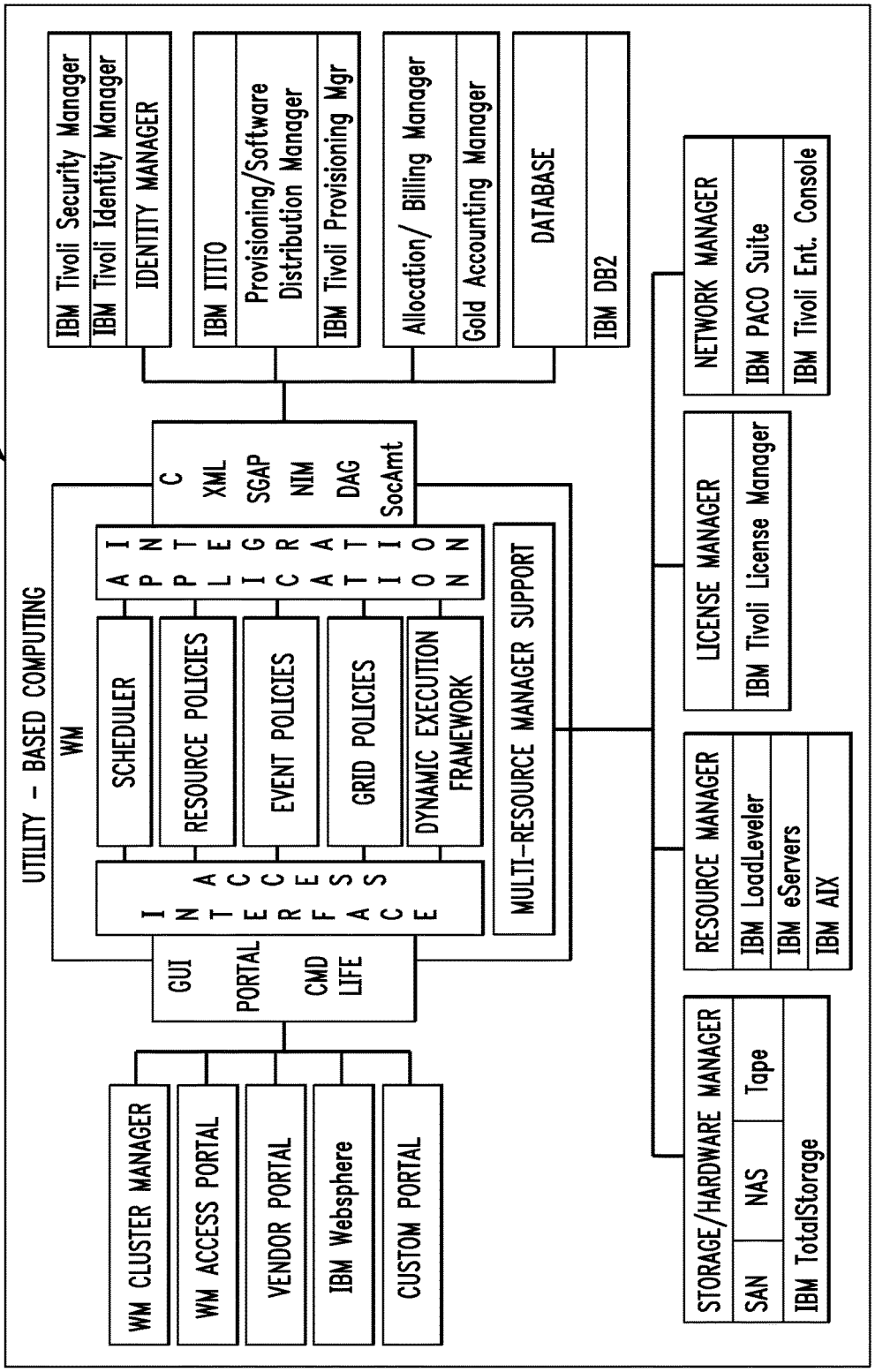
FIG. 5 illustrates various components of utility-based computing.

FIG. 5 illustrates graphically 500 how the software integrates with other technologies. The items along the bottom are resource types such as storage, licenses, and networks. The items on the left are interface mechanisms for end users and administrators. Items on the right side of the figure are service with which the software can integrate to provide additional extended capabilities such as provisioning, database-centric reporting and allocation management. The example software packages shown in FIG. 5 are primarily IBM products but of course other software can be integrated.

Figure 6:
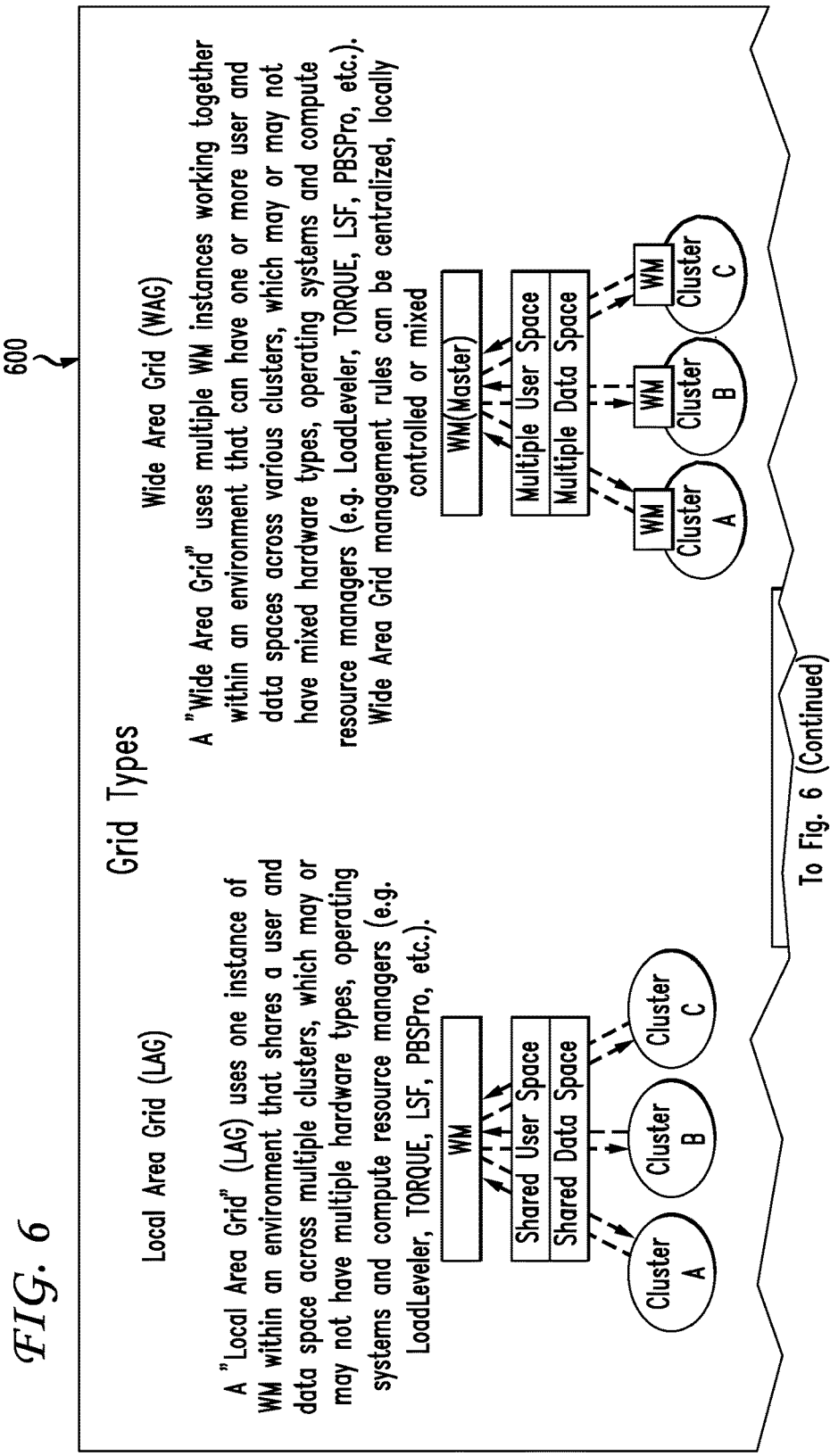
FIG. 6 illustrates grid types.
Figure 6:
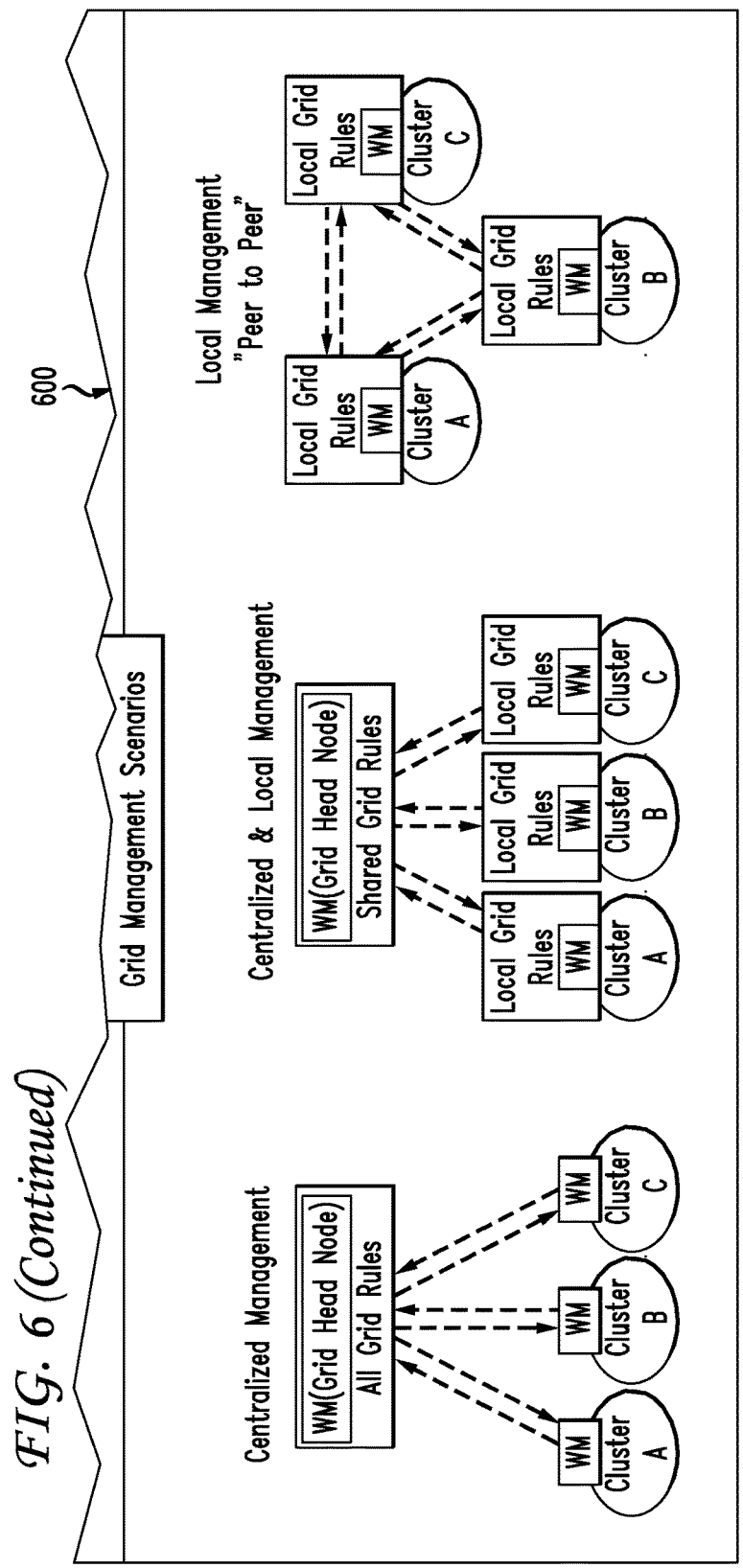

Regarding the flexibility of management models, the software enables providing the capacity on demand capability any supported cluster environment or grid environment. The software can be configured to enable multiple grid types and management models. The two preferable grid types enabled by the software are local area grids and wide area grids, although others are also enabled. FIG. 6 illustrates 600 examples of various grid types as well as various grid management scenarios. A "Local Area Grid" (LAG) uses one instance of a workload manager WM, such as Moab, within an environment that shares a user and data space across multiple clusters, which can have multiple hardware types, operating systems and compute resource managers (e.g. LoadLeveler, TORQUE, LSF, PBSPro, etc.). The benefits of a LAG are that it is very easy to set up and even easier to manage. In essence all clusters are combined in a LAG using one instance of the WM, eliminating redundant policy management and reporting. The clusters appear to be a mixed set of resources in a single big cluster. A "Wide Area Grid" (WAG) uses multiple WM instances working together within an environment that can have one or more user and data spaces across various clusters, which can have mixed hardware types, operating systems and compute resource managers (e.g. LoadLeveler, TORQUE, LSF, PBSPro, etc.). WAG management rules can be centralized, locally controlled or mixed. The benefit of a WAG is that an organization can maintain the sovereign management of its own local cluster, while still setting strict or relaxed political sharing policies of its resources to the outside grid. Collaboration can be facilitated with a very flexible set of optional policies in the areas of ownership, control, information sharing and privacy. Sites are able to choose how much of their cluster's resources and information they share with the outside grid.

Grids are inherently political in nature and flexibility to manage what information is shared and what information is not is central to establishing such grids. Using the software, administrators can create policies to manage information sharing in difficult political environments.

Organizations can control information sharing and privacy in at least three different ways: (1) Allow all resource (e.g. nodes, storage, etc.), workload (e.g. jobs, reservations, etc.) and policy (e.g. sharing and prioritization rules) information to be shared to provide full accounting and reporting; (2) Allow other sites to only see resource, workload and policy information that pertains to them so that full resource details can be kept private and more simplified; (3) Allow other sites to only see a single resource block, revealing nothing more than the aggregate volume of resources available for reservation and use by the other site. This allows resources, workload and policy information to be kept private, while still allowing shared relationships to take place. For example, a site that has 1,024 processors can publicly display only 64 processors to other sites on the grid.

Figure 7:
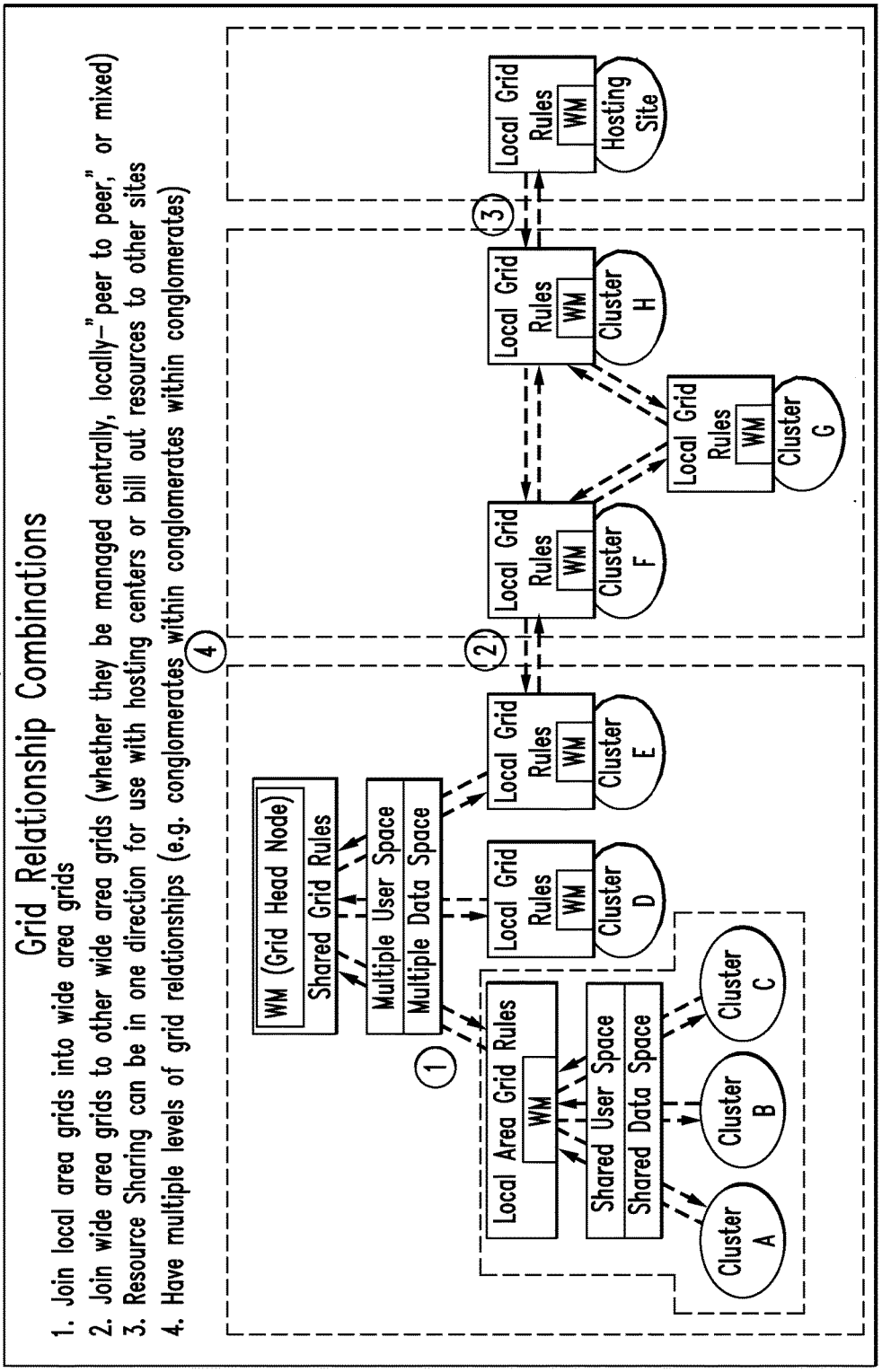
FIG. 7 illustrates grid relationship combinations.

The above mentioned grid types and management scenarios can be combined together with the information sharing and privacy rules to create custom relationships that match the needs of the underlying organizations. FIG. 7 illustrates an example of how grids can be combined. Many combinations are possible.

The software is able to facilitate virtually any grid relationship such as by joining local area grids into wide area grids; joining wide area grids to other wide area grids (whether they be managed centrally, locally—"peer to peer," or mixed); sharing resources in one direction (e.g. for use with hosting centers or lease out one's own resources); enabling multiple levels of grid relationships (e.g. conglomerates within conglomerates). As can be appreciated, the local environment can be one of many configurations as discussed by way of example above.

Various aspects of the disclosure with respect to accessing an on-demand center from a local environment will be discussed next. One aspect relates to enabling the automatic detection of an event such as resource thresholds or service thresholds within the compute environment 104. For example, if a threshold of 95% of processor consumption is met because 951 processors out of the 1000 processors in the environment are being utilized, then the WM 108 can automatically establish a connection with the on-demand environment 102. A service threshold, a policy-based threshold, a hardware-based threshold or any other type of threshold can trigger the communication to the hosting center 102. Other events as well can trigger communication with the hosting center such as a workload backlog having a certain configuration. The WM 108 then can communicate with WM 106 to reserve resources, and then provision or customize the reserved on-demand resources 102. The creation of a VPC within the on-demand center can occur. The two environments exchange the necessary information to create reservations of resources, provision the resources, manage licensing, and so forth, necessary to enable the automatic transfer of jobs or other workload from the local environment 104 to the on-demand environment 102. Nothing about a user job 110 submitted to a WM 108 changes. The physical environment of the local compute environment 104 can also be replicated in the on-demand center. The on-demand environment 102 then instantly begins running the job without any change in the job or perhaps even any knowledge of the submitter.

In another aspect, predicted events can also be triggers. For example, a predicted failure of nodes within the local environment, predicted events internal or external to the environment, or predicted meeting of thresholds can trigger communication with the on-demand center. These are all configurable and can either automatically trigger the migration of jobs or workload or can trigger a notification to the user or administrator to make a decision regarding whether to migrate workload or access the on-demand center.

Regarding the analysis and transfer of backlog workload, the method embodiment provides for determining whether a backlog workload condition exists in the local compute environment. If the backlog workload condition exists, then the system analyzes the backlog workload, communicates information associated with the analysis to the on-demand compute environment, establishes a reservation of resources in the on-demand compute environment to yield reserved resources, provisions the reserved resources in the on-demand compute environment to yield provisional resources in the on-demand compute environment according to the analyzed backlog workload and transfers the backlog workload to the provisioned resources. It is preferable that the provisioning the on-demand compute environment further includes establishing a reservation of resources to create a virtual private cluster within the on-demand compute environment. Analyzing the workload can include determining at least one resource type associated with the backlog workload for provisioning in the on-demand compute environment.

In another aspect, analyzing the backlog workload, communicating the information associated with analysis to the on-demand compute environment, reserving resources at a future time in the on-demand compute environment to yield reserved resources, provisioning the reserved resources in the on-demand compute environment according to the analyzed backlog workload and transferring the backlog workload to the provisioned resources in the on-demand compute environment occurs in response to a one-click operation from an administrator. However, the process of reserving, provisioning and transferring backlog workload to the on-demand center can begin based on any number of events. For example, a user can interact with a user interface to initiate the transfer of backlog workload. An internal event such as a threshold, for example, a wait time reaching a maximum, can be an event that could trigger the analysis and transfer. An external event can also trigger the transfer of backlog workload such as a terrorist attack, weather conditions, power outages, etc.

There are several aspects to this disclosure that are shown in the attached source code. One is the ability to exchange information. For example, for the automatic transfer of workload to the on-demand center, the system will import remote classes, configuration policy information, physical hardware information, operating systems and other information from environment 102 the WM 108 to the slave WM 106 for use by the on-demand environment 102. Information regarding the on-demand compute environment, resources, policies and so forth are also communicated from the slave WM 106 to the local WM 108.

A method embodiment can therefore provide a method of managing resources between a local compute environment and an on-demand compute environment. An exemplary method includes detecting an event associated with a local compute environment. As mentioned the event can be any type of trigger or threshold. The software then identifies information about the local compute environment, establishes communication with an on-demand compute environment and transmits the information about the local environment to the on-demand compute environment. With that information, the software establishes at a first time an advanced reservation of resources in the on-demand compute environment to yield reserved resources, and then provisions the reserved resources within the on-demand compute environment to duplicate or substantially duplicate the local compute environment and transfers workload from the local-environment to the provisional resources in the on-demand compute environment. The workload consumes the provisional resources at a second time which is later than the first time. In another aspect, the provisioning does not necessarily duplicate the local environment but specially provisions the on-demand environment for the workload to be migrated to the on-demand center. As an example, the information communicated about the local environment can relate to at least hardware and/or an operating system. But the workload to be transferred to the on-demand center may have an affinity to hardware and/or an operating system that differs from that in the local compute environment. Therefore, the software can request different hardware and/or software in the on-demand center from the configuration of the local compute environment. Establishing communication with the on-demand compute environment and transmitting the information about the local environment to the on-demand compute environment can be performed automatically or manually via a user interface. Using such an interface can enable the user to provide a one-click or one action request to establish the communication and migrate workload to the on-demand center.

In some cases, as the software seeks to reserve and provision resources, a particular resource cannot be duplicated in the on-demand compute environment. In this scenario, the software will identify and select a substitute resource. This process of identifying and selecting a substitute resource can be accomplished either at the on-demand environment or via negotiation between a slave workload manager 120 at the on-demand environment and a master workload manager 108 on the local compute environment. The method further can include identifying a type of workload to transfer to the on-demand environment 102, and wherein transferring workload from the local-environment 104 to the on-demand compute environment 102 further includes only transferring the identified type of workload to the on-demand center. In another aspect, the transferring of the identified type of workload to the on-demand center 102 is based upon different hardware and/or software capabilities between the on-demand environment and the local compute environment.

Another aspect of the disclosure is the ability to automate data management between two sites. This involves the transparent handling of data management between the on-demand environment 102 and the local environment 104 that is transparent to the user. In other words, it can be accomplished without explicit action or configuration by the user. It can also be unknown to the user. Yet another aspect relates to a simple and easy mechanism to enable on-demand center integration. This aspect of the disclosure involves the ability of the user or an administrator to, in a single action like the click of a button, the touching of a touch sensitive screen, motion detection, or other simple action, command the integration of an on-demand center information and capability into the local WM 108. In this regard, the system will be able to automatically exchange and integrate all the necessary information and resource knowledge in a single click to broaden the set of resources that can be available to users who have access initially only to the local compute environment 104. The information can include the various aspect of available resources at the on-demand center such as time-frame, cost of resources, resource type, etc.

One of the aspects of the integration of an on-demand environment 102 and a local compute environment 104 is that the overall data appears locally. In other words, the WM 108 will have access to the resources and knowledge of the on-demand environment 102 but the view of those resources, with the appropriate adherence to local policy requirements, is handled locally and appears locally to users and administrators of the local environment 104.

Another aspect is enabled with the attached source code is the ability to specify configuration information associated with the local environment 104 and feeding it to the hosting center 102. For example, the interaction between the compute environments supports static reservations. A static reservation is a reservation that a user or an administrator cannot change, remove or destroy. It is a reservation that is associated with the WM 108 itself. A static reservation blocks out time frames when resources are not available for other uses. For example, if, to enable a compute environment to run (consume) resources, a job takes an hour to provision a resource, then the WM 108 can establish a static reservation of resources for the provisioning process. The WM 108 will locally create a static reservation for the provisioning component of running the job. The WM 108 will report on these constraints associated with the created static reservation.

Then, the WM 108 can communicate with the slave WM 106 if on-demand resources are needed to run a job. The WM 108 communicates with the slave WM 106 and identifies what resources are needed (20 processors and 512 MB of memory, for example) and inquires when can those resources be available. Assume that WM 106 responds that the processors and memory will be available in one hour and that the WM 108 can have those resources for 36 hours. The system can establish a normal reservation of the processors and memory in the on-demand center starting in an hour and lasting for 36 hours. Once all the appropriate information has been communicated between the WM 106 and WM 108, then WM 108 creates a static reservation in the on-demand center to block the first part of the resources which requires the one hour of provisioning. The WM 108 can also block out the resources with a static reservation from hour 36 to infinity until the resources go away. Therefore, from zero to one hour is blocked out by a static reservation and from the end of the 36 hours to infinity is blocked out with a static reservation. In this way, the scheduler 108 can optimize the on-demand resources and insure that they are available for local workloads. The communication between the WMs 106 and 108 is performed preferably via tunneling.

Yet another aspect is the ability to have a single agent such as the WM 108 or some other software agent detect a parameter, event or configuration in the local environment 104. The environment in this sense includes both hardware and software and other aspects of the environment. For example, a cluster environment 104 can have, besides the policies and restrictions on users and groups as discussed above, a certain hardware/software configuration such as a certain number of nodes, a certain amount of memory and disk space, operating systems and software loaded onto the nodes and so forth. The agent (which can be WM 108 or some other software module) determines the physical aspects of the compute environment 104 and communicates with the on-demand hosting center to provide an automatic reservation of and provisioning of reserved resources within the center 102 such that the local environment is duplicated. The duplication can match the same hardware/software configuration or can dynamically or manually substitute alternate components. The communication and transfer of workload to a replicated environment within the hosting center 102 can occur automatically (say at the detection of a threshold value) or at the push of a button from an administrator. Therefore information regarding the local environment is examined and the WM 108 or another software agent transfers that information to the hosting center 102 for replication.

The replication, therefore, involves providing the same or perhaps similar number of nodes, provisioning operating systems, file system architecture and memory and any other hardware or software aspects of the hosting center 102 using WM 106 to replicate the compute environment 104. Those of skill in the art will understand that other elements that can need to be provisioned to duplicate the environment. Where the exact environment cannot be replicated in the hosting center 102, decisions can be made by the WM 106 or via negotiation between WM 106 and WM 108 to determine an alternate provisioning.

In another aspect, a user of the compute environment 104 such as an administrator can configure at the client site 104 a compute environment and when workload is transferred to the hosting center 102, the desired compute environment can be provisioned. In other words, the administrator could configure a better or more suited environment than the compute environment 104 that exists. As an example, a company can want to build a compute environment 104 that will be utilized by processor intensive jobs and memory intensive jobs. It can be cheaper for the administrator of the environment 104 to build an environment that is better suited to the processor intensive jobs. The administrator can configure a processor intensive environment at the local cluster 104 and when a memory intensive job 110 is submitted, the memory intensive environment can be reserved and provisioned in the hosting center 102 to offload that job.

In this regard, the administrator can generate profiles of various configurations for various "one-click" provisioning on the hosting center 102. For example, the administrator can have profiles for compute intensive jobs, memory intensive jobs, types of operating system, types of software, any combination of software and hardware requirements and other types of environments. Those of skill in the art will understand the various types of profiles that can be created. The local cluster 104 has a relationship with the hosting center 102 where the administrator can transfer workload based on one of the one or more created profiles. This can be done automatically if the WM 108 identifies a user job 110 that matches a profile or can be done manually by the administrator via a user interface that can be graphical. The administrator can be able to, in "one click," select the option to have resources in the on-demand center reserved and provisioned to receive a memory intensive component of the workload to process according to the memory-intensive profile.

The relationship between the hosting center 102 and the local cluster 104 by way of arranging for managing the workload can be established in advance or dynamically. The example above illustrates the scenario where the arrangement is created in advance where profiles exist for selection by a system or an administrator. The dynamic scenario can occur where the local administrator for the environment 104 has a new user with a different desired profile than the profiles already created. The new user wants to utilize the resources 104. Profiles configured for new users or groups can be manually added and/or negotiated between the hosting center 102 and the local cluster 104 or can be automatic. There can be provisions made for the automatic identification of a different type of profile and WM 108 (or another module) can communicate with WM 106 (or another module) to arrange for the availability/capability of the on-demand center to handle workload according to the new profile and to arrange cost, etc. If no new profile can be created, then a default or generic profile, or the closest previously existing profile to match the needs of the new user's job can be selected. In this manner, the system can easily and dynamically manage the addition of new users or groups to the local cluster 104.

In this regard, when WM 108 submits a query to the WM 106 stating that it needs a certain set of resources, it passes the profile(s) as well. Receiving resource requirement information may be based on user specification, current or predicted workload. The specification of resources may be one of fully explicit, partially explicit, fully implicit based on workload, and based on virtual private cluster (VPC) package concept where VPC package can include aspects of allocated or provisioning support environment and adjustments to resource request timeframes including pre-allocation, allocation duration, and post-allocation timeframe adjustments. The incorporated application above includes the discussion of virtual private clusters which are completely applicable and integrated into this disclosure and capability with on-demand centers. The reserved resources may be associated with provisioning or customizing the delivered compute environment. A reservation may involve the co-allocation of resources including any combination of compute, network, storage, license, or service resources (i.e., parallel database services, security services, provisioning services) as part of a reservation across multiple different resource types. Also, the co-allocation of resources over disjoint timeframes to improve availability and utilization of resources may be part of a reservation or a modification of resources. Resources may also be reserved with automated failure handling and resource recovery. WM 106 identifies when resources are available in static dimensions (such as identifies that a certain amount of memory, nodes and/or other types of architecture are available). This step will identify whether the requestor obtains the raw resources to meet those needs. Then the WM 106 will manage the customer install and provisioning of the software, operating systems, and so forth according to the received profile. In this manner, the entire specification of needs according to the profile can be met.

Another aspect of the disclosure relates to looking at the workload overflowing to the hosting center. The system can customize the environment for the particular overflow workload. This was referenced above. The agent 108 can examine the workload on the local cluster 104 and determine what part of that workload or if all of that workload, can be transferred to the hosting center 102. The agent identifies whether the local environment is overloaded with work and what type of work is causing the overload. The agent can preemptively identify workload that would overload the local environment or can dynamically identify overload work being processed. For example, if a job 110 is submitted that is both memory intensive and processor intensive, the WM 108 will recognize that and intelligently communicate with the WM 106 to transfer the processor intensive portion of the workload to reserve resources in the hosting center 102. This can be preferable for several reasons. Perhaps it is cheaper to utilize hosting center 102 processing time for processor intensive time. Perhaps the local environment 104 is more suited to the memory intensive component of the workload. Also, perhaps restrictions such as bandwidth, user policies, current reservations in the local 104 or hosting 102 environment and so forth can govern where workload is processed. For example, the decision of where to process workload can be in response to the knowledge that the environment 104 is not as well suited for the processor intensive component of the workload or due to other jobs running or scheduled to run in the environment 104. As mentioned above, the WM 106 manages the proper reservation and provisioning of resources in the hosting center environment for the overflow workload.

Where the agent has identified a certain type of workload that is causing the overload, the system can automatically reserve and provision resources in the hosting center to match the overload workload and then transfer that workload over.

As another example of how this works, a threshold can be met for work being processed on the local cluster 104. The threshold can be met by how much processing power is being used, how much memory is available, whether the user has hit a restriction on permissions, and/or a determination that a quality of service has not been met or any other parameter. Once that threshold is met, either automatically or via an administrator, a button can be pressed and WM 108 analyzes the workload on the environment 104. The WM 108 can identify that there is a backlog and determine that more nodes are needed (or more of any specific type of resource is needed). The WM 108 will communicate with WM 106 to enable, at a first time, the creation of an advanced reservation of resources in the hosting center. The WM 108/106 autoprovisions the reserved resources within the hosting center to meet the needs of the backlogged jobs. The appropriate resources, hardware, software, permissions and policies can be duplicated exactly or in an acceptable fashion to resolve the backlog. Further, the autoprovisioning can be performed with reference to the backlog workload needs rather than the local environment configuration. In this respect, the overflow workload is identified and analyzed and the reservation and provisioning in the hosting center is matched to the workload itself (in contrast to matching the local environment) for processing when the backlog workload is transferred. The reservation of the resources is for a second time which is later than the first time. Thus, the workload is transferred such that the reservation insures that the reserved resources are available for the workload. Therefore, the reservation and provisioning can be based on a specific resource type that will resolve most efficiently the backlog workload.

Figure 8:
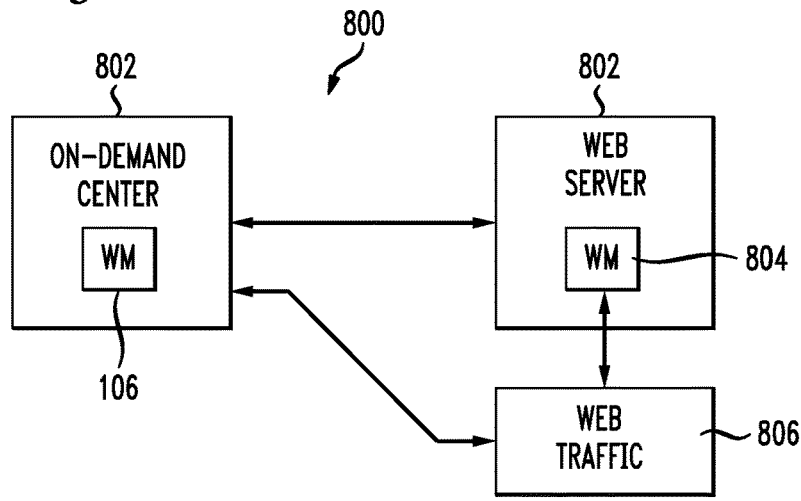
FIG. 8 illustrates graphically a web-server aspect of the disclosure.

One aspect of this disclosure relates to the application of the concepts above to provide a website server with backup computing power via a hosting center 102. This aspect of the disclosure is shown by the system 800 in FIG. 8. The hosting center 102 and WM 106 are configured as discussed above and adjustment as necessary are made to communicate with a webserver 802. A website version of the workload manager (WM) 804 would operate on the webserver 302. Known adjustments are made to enable the Domain Name Service (DNS) to provide for setting up the overflow of network traffic to be directed to either the web server 802 or the hosting center 102. In another aspect, the webserver would preferably handle all of the rerouting of traffic to the on-demand center once it was reserved and provisioned for overflow web traffic. In another aspect, a separate network service can provide the control of web traffic control directed to either the webserver or the on-demand center. One of skill in the art will understand the basic information about how internet protocol (IP) packets of information are routed between a web browser on a client compute device and a web server 802.

In this regard, the WM 804 would monitor the web traffic 306 and resources on the web server 802. The web server 802 of course can be a cluster or group of servers configured to provide a website. The WM 804 is configured to treat web traffic 806 and everything associated with how the web traffic consumes resources within the web server 802 as a job or a group of jobs. An event such as a threshold is detected by WM 804. If the threshold is passed or the event occurs, the WM 804 communicates with the WM 106 of the hosting center 102, the WM 106 establishes an advanced reservation of resources to yield reserved resources and then autoprovisions the reserved resources and enables web traffic to flow to the autoprovisioned resources in the hosting center 102 where the requests would be received and webpages and web content is returned. The provisioning of resources can also be performed manually for example in preparation for increased web traffic for some reason. As an example, if an insurance company knows that a hurricane is coming it can provide for and prepare for increased website traffic.

The management of web traffic 806 to the webserver 802 and to the hosting center 102 can also be coordinated such that a portion of the requests go directly to the hosting center 102 or are routed from the web server 802 to the hosting center 102 for response. For example, once the provisioning in the reserved resources in the hosting center 102 is complete, an agent (which can communicate with the WM 804) can then intercept web traffic directed to the web server 302 and direct it to the hosting center 102, which can deliver website content directly to the client browser (not shown) requesting the information. Those of skill in the art will recognize that there are several ways in which web traffic 806 can be intercepted and routed to the provisioned reserved resources at the hosting center 102 such that it is transparent to the client web browser that a hosting center 102 rather than the web server 802 is servicing the web session.

The identification of the threshold can be based on an increase of current traffic or can be identified from another source. For example, if the New York Times or some other major media outlet mentions a website, that event can cause a predictable increase in traffic. In this regard, one aspect of the disclosure is a monitoring of possible triggers to increased web activity. The monitoring can be via a Google (or any type of) automatic search of the website name in outlets like www.nytimes.com, www.washingtonpost.com or www.powerlineblog.com. If the website is identified in these outlets, then an administrator or automatically the provisioning of reserved resources can occur at a predictable time of when the increased traffic would occur.

Another aspect of the disclosure is illustrated in an example. In one case, a small website (we can call it www.smallsite.com) was referenced in the Google™ search engine page. Because of the large number of users of Google, www.smallsite.com went down. To prevent this from happening, when a high traffic source such as www-.google.com or www.nytimes.com links to or references a small or low traffic website, then an automatic reservation and provisioning of reserved resources can be performed. For example, if the link from Google to www.smallsite.com were created, and the system (either Google or a special feature available with any website) identified that such a link was established which is likely to cause an increased amount of traffic, then the necessary reservation, provisioning, mirroring of content, and so forth, could occur between the web server 802 and the hosting center 102 and the necessary DNS modifications to enable the off-loading of some or all of the web traffic to the hosting center.

If some of the traffic is routed to the hosting center 102, then provisions are made to send that traffic either directly or indirectly to the reserved, provisioned resources in the hosting center 102. In one aspect, the data is mirrored to the hosting center 102 and the hosting center can exclusively handle the traffic until a certain threshold is met and the web traffic can be automatically transferred back to the web server 802.

The off-loading of web traffic can be featured as an add-on charge available to websites as well as charges or fees for the services that can be used to identify when traffic can increase. External forces (such as mentioning a website on the news) can trigger the increase as well as internal forces. For example, if a special offer is posted on a website for a reduced price for a product, then the website can expect increased traffic. In this regard, there can be a "one-click" option to identify a time period (1 day offloading) and a starting time (2 hours after the offer is posted) for the offloading to occur.

As can be appreciated, the principles of the present disclosure enable the average user "surfing" the web to enjoy access and experience websites that can otherwise be unavailable due to large internet traffic. The benefit certainly inures to website owners and operators who will avoid unwanted down time and the negative impact that can have on their business.

Figure 9:
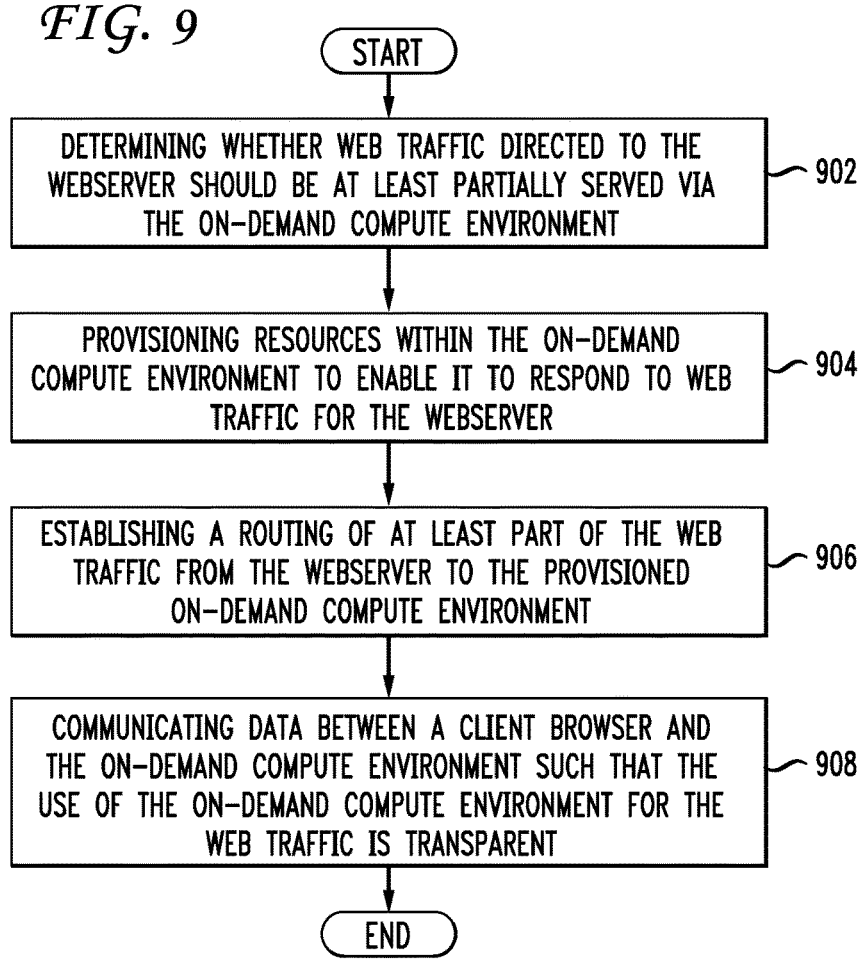
FIG. 9 illustrates a method aspect of the disclosure.

FIG. 9 illustrates a method aspect of the webserver embodiment of the disclosure. Here, a method of managing resources between a webserver and an on-demand compute environment is disclosed with the method including determining whether web traffic directed to the webserver should be at least partially served via the on-demand compute environment (902), reserving resources in the on-demand compute environment to yield reserved resources, provisioning the reserved resources within the on-demand compute environment to enable it to respond to web traffic for the webserver (904), establishing a routing of at least part of the web traffic from the webserver to the provisioned resources in the on-demand compute environment (906) and communicating data between a client browser and the on-demand compute environment such that the use of the on-demand compute environment for the web traffic is transparent (908).

While the claims below are method claims, it is understood that the steps can be practiced by compute modules in a system embodiment of the disclosure as well as being related to instructions for controlling a compute device stored on a computer-readable medium. The disclosure can also include a local compute environment 104 and/or an on-demand center 102 configured to operated as described above. A webserver(s) 802 and/or the on-demand center 102 with any other network nodes configured to enable the offloading of web traffic 806 can also be an embodiment of the disclosure. This can also involve an additional software alteration on a web browser to enable the offloading of web traffic. Further, any hardware system or network can also be embodied in the disclosure.

Embodiments within the scope of the present disclosure can also include transitory or non-transitory computer-readable media for carrying or having computer-executable instructions or data structures stored thereon. Such computer-readable media can be any available media that can be accessed by a general purpose or special purpose computer.

By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Non-transitory computer readable media excludes energy and signals per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description can contain specific details, they should not be construed as limiting the claims in any way. Other configurations of the described embodiments of the disclosure are part of the scope of this disclosure. Accordingly, the appended claims and their legal equivalents should only define the disclosure, rather than any specific examples given.

The invention claimed is:

1. A method comprising:
    based on a detected event associated with a local compute environment, wherein the local compute environment is separate from a remote compute environment, receiving information about the local compute environment at the remote compute environment;
    receiving a request for resources in the remote compute environment, wherein a specification of resources is associated with the request, the specification of resources being based on a virtual private cluster package, where the virtual private cluster package comprises provisioning a support environment and adjustments to resource request timeframes including pre-allocation, allocation duration, and post-allocation timeframe adjustments;
    based on the information and the specification of resources, reserving compute resources in the remote compute environment for a specific workload, to yield reserved compute resources, and wherein the reserved compute resources comprise at least one processor;
    provisioning the reserved compute resources within the remote compute environment, wherein a configuration of the remote compute environment substantially duplicates a configuration of the local compute environment; and
    receiving the specific workload from the local compute environment to the reserved compute resources in the remote compute environment, wherein the specific workload consumes the reserved compute resources.

2. The method of claim 1, wherein the detected event is at least one of the passing of a threshold related to performance of the local compute environment associated with workload and a triggering event.

3. The method of claim 1, wherein the information about the local compute environment is related to at least one of: hardware and an operating system.

4. The method of claim 1, wherein the detected event is a one-click step performed by a user.

5. The method of claim 1, wherein provisioning the reserved compute resources within the remote compute environment further comprises:
    if a particular resource cannot be duplicated in the remote compute environment, then identifying and selecting a substitute resource.

6. The method of claim 5, wherein identifying and selecting a substitute resource is accomplished either at the remote compute environment or via negotiation between a slave workload manager at the remote compute environment and a master workload manager on the local compute environment.

7. The method of claim 1, wherein receiving the specific workload from the local compute environment at the remote compute environment further comprises only receiving an identified type of workload at the remote compute environment.

8. The method of claim 7, wherein receiving the identified type of workload at the remote compute environment is based upon one of different hardware and different software capabilities between the remote compute environment and the local compute environment.

9. The method of claim 1, wherein provisioning the reserved compute resources within the remote compute environment further comprises creating a virtual private cluster in the remote compute environment.

10. The method of claim 9, wherein the virtual private cluster further comprises an aggregate of compute resources in the remote compute environment having partitions and wherein only partitioned resources are accessible by the local compute environment.

11. The method of claim 1, further comprising:
    receiving at least one profile as part of the information transmitted to the remote compute environment, wherein the profile is associated with other workload to be processed in the local compute environment; and
    provisioning the reserved compute resources at least in part based on the profile.

12. The method of claim 1, wherein the detected event is a backlog workload condition in the local compute environment yielding a backlog workload, wherein the information received at the remote compute environment comprises an analysis of the backlog workload, the method further comprising:
provisioning the reserved compute resources in the remote compute environment according to the analysis to yield provisioned resources; and
receiving the backlog workload to the provisioned resources in the remote compute environment.

13. The method of claim 12, wherein provisioning the remote compute environment further comprises creating a virtual private cluster within the remote compute environment.

14. The method of 12, wherein the analysis comprises a determination of at least one resource type associated with the backlog workload for provisioning in the remote compute environment.

15. The method of claim 1, wherein provisioning the reserved compute resources within the remote compute environment comprises modifying flexible attributes of the reserved compute resources within the remote compute environment. more of a terrorist attack, pre- determined weather conditions, and power outages.

16. The method of claim 1, wherein the detected event is a wait time reaching a threshold.

17. The method of claim 1, wherein the detected event is one or more of a terrorist attack, pre-determined weather conditions, and power outages.

18. A system comprising:
a processor; and
a computer-readable storage medium storing instructions which, when executed by the
processor, cause the processor to perform operations comprising:
based on a detected event associated with a local compute environment, wherein the local compute environment is separate from a remote compute environment, receiving information about the local compute environment at the remote compute environment;
receiving a request for resources in the remote compute environment, wherein a specification of resources is associated with the request, the specification of resources being based on a virtual private cluster package, where the virtual private cluster package comprises provisioning a support environment and adjustments to resource request timeframes including pre-allocation, allocation duration, and post-allocation timeframe adjustments;
based on the information and the specification of resources, reserving compute resources in the remote compute environment for a specific workload, to yield reserved compute resources, and wherein the reserved compute resources comprise at least one processor;
provisioning the reserved compute resources within the remote compute environment, wherein a configuration of the remote compute environment duplicates a configuration of the local compute environment; and
receiving the specific workload from the local compute environment to the reserved compute resources in the remote compute environment, wherein the specific workload consumes the reserved compute resources.

19. A non-transitory computer-readable storage device storing instructions, which when executed by a processor, cause the processor to perform operations comprising:
based on a detected event associated with a local compute environment, wherein the local compute environment is separate from a remote compute environment, receiving information about the local compute environment at the remote compute environment;
receiving a request for resources in the remote compute environment, wherein a specification of resources is associated with the request, the specification of resources being based on a virtual private cluster package, where the virtual private cluster package comprises provisioning a support environment and adjustments to resource request timeframes including pre-allocation, allocation duration, and post-allocation timeframe adjustments;
based on the information and the specification of resources, reserving compute resources in the remote compute environment for a specific workload, to yield reserved compute resources, and wherein the reserved compute resources comprise at least one processor;
provisioning the reserved compute resources within the remote compute environment, wherein a configuration of the remote compute environment duplicates a configuration of the local compute environment; and
receiving the specific workload from the local compute environment to the reserved compute resources in the remote compute environment, wherein the specific workload consumes the reserved compute resources.

* * * * *